United States Patent
Tazuke et al.

(10) Patent No.: US 11,093,974 B2
(45) Date of Patent: Aug. 17, 2021

(54) IMAGE ATTRIBUTE PROCESSING SYSTEM, IMAGE ATTRIBUTE PROCESSING APPARATUS, AND METHOD OF PROCESSING IMAGE ATTRIBUTES

(71) Applicants: Tomoyuki Tazuke, Tokyo (JP); Muneyuki Hamabe, Kanagawa (JP); Akihiro Kakinuma, Kanagawa (JP)

(72) Inventors: Tomoyuki Tazuke, Tokyo (JP); Muneyuki Hamabe, Kanagawa (JP); Akihiro Kakinuma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 211 days.

(21) Appl. No.: 16/238,845

(22) Filed: Jan. 3, 2019

(65) Prior Publication Data

US 2019/0220900 A1 Jul. 18, 2019

(30) Foreign Application Priority Data

Jan. 12, 2018 (JP) .............................. JP2018-003093

(51) Int. Cl.
*G06Q 30/02* (2012.01)
*G06K 9/00* (2006.01)
*G06K 9/62* (2006.01)
*G06K 9/64* (2006.01)
*G06K 9/68* (2006.01)

(52) U.S. Cl.
CPC ..... *G06Q 30/0269* (2013.01); *G06K 9/00369* (2013.01); *G06K 9/6228* (2013.01); *G06K 9/6257* (2013.01); *G06K 9/6268* (2013.01); *G06K 9/64* (2013.01); *G06K 9/6814* (2013.01); *G06Q 30/0201* (2013.01)

(58) Field of Classification Search
CPC .......... G06Q 30/0269; G06Q 30/0201; G06K 9/00369; G06K 9/6228; G06K 9/6257; G06K 9/6268; G06K 9/64; G06K 9/6814
See application file for complete search history.

(56) References Cited

U.S. PATENT DOCUMENTS

| | | | | |
|---|---|---|---|---|
| 9,262,445 B2 * | 2/2016 | Datta | ................... | G06F 16/5838 |
| 10,235,604 B2 * | 3/2019 | Kouchnir | ............ | G06F 16/5866 |
| 10,277,714 B2 * | 4/2019 | Bullock | ............ | G06Q 30/0201 |

(Continued)

FOREIGN PATENT DOCUMENTS

| | | |
|---|---|---|
| JP | 2005-327198 | 11/2005 |
| JP | 2017-076315 | 4/2017 |

*Primary Examiner* — Mia M Thomas
(74) *Attorney, Agent, or Firm* — Harness, Dickey & Pierce, P.L.C.

(57) ABSTRACT

An information processing system includes circuitry configured to store, in a memory, one or more feature value patterns associated with appearance attribute of one or more groups of persons calculated from a plurality of acquired image data using machine learning, in which each one of the groups assumed to have a unique group value being different for each one of the groups, receive image data of a target person input as analysis target data, analyze an appearance attribute of the target person in the image data using the one or more feature value patterns associated with the appearance attribute of the one or more groups stored in the memory, and output a response corresponding to an analysis result of the appearance attribute of the target person.

12 Claims, 33 Drawing Sheets

(56) References Cited

U.S. PATENT DOCUMENTS

| | | | | |
|---|---|---|---|---|
| 10,963,939 B1* | 3/2021 | Zehr | ............... | G06K 9/6256 |
| 2005/0267890 A1* | 12/2005 | Itoh | ............... | G06Q 10/10 |
| 2007/0091106 A1* | 4/2007 | Moroney | ............... | G06N 20/00 |
| | | | | 345/581 |
| 2013/0182910 A1* | 7/2013 | Burry | ............... | G06K 9/6279 |
| | | | | 382/105 |
| 2015/0039542 A1* | 2/2015 | Datta | ............... | G06K 9/481 |
| | | | | 706/12 |
| 2015/0063688 A1* | 3/2015 | Bhardwaj | ............... | G06K 9/3258 |
| | | | | 382/159 |
| 2015/0161625 A1* | 6/2015 | Heath | ............... | G06Q 50/01 |
| | | | | 705/7.29 |
| 2016/0124690 A1* | 5/2016 | Kimura | ............... | G06F 3/1242 |
| | | | | 358/1.15 |
| 2017/0278265 A1* | 9/2017 | Yamamoto | ............... | H04N 5/247 |
| 2018/0181802 A1* | 6/2018 | Chen | ............... | G06N 3/0454 |
| 2018/0322373 A1* | 11/2018 | Kolouri | ............... | G06K 9/6257 |
| 2019/0236531 A1* | 8/2019 | Adato | ............... | G06Q 10/087 |
| 2020/0042781 A1* | 2/2020 | Zuckerman | ............... | G06F 16/29 |
| 2020/0143454 A1* | 5/2020 | Ananthanarayana | ............... | |
| | | | | G06Q 30/0643 |
| 2020/0304755 A1* | 9/2020 | Narayan | ............... | G06K 9/00744 |
| 2021/0035183 A1* | 2/2021 | Saternos | ............... | G06N 20/20 |

* cited by examiner

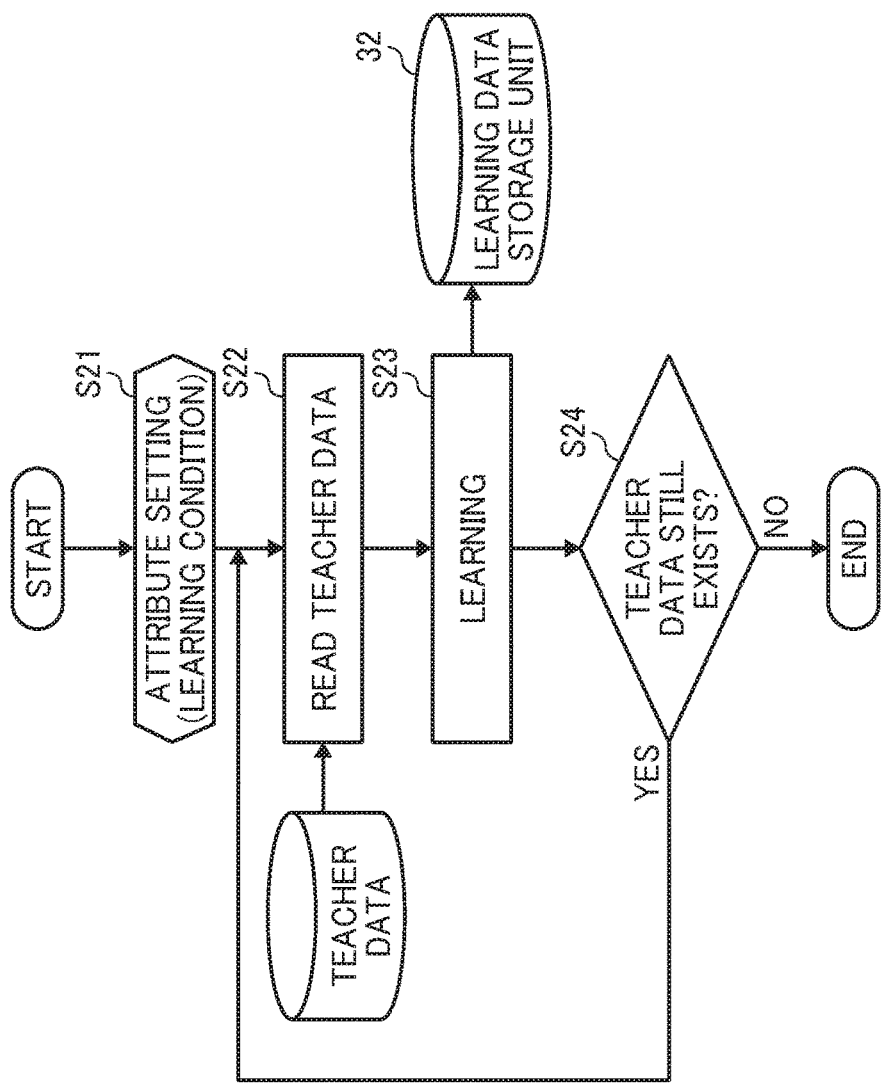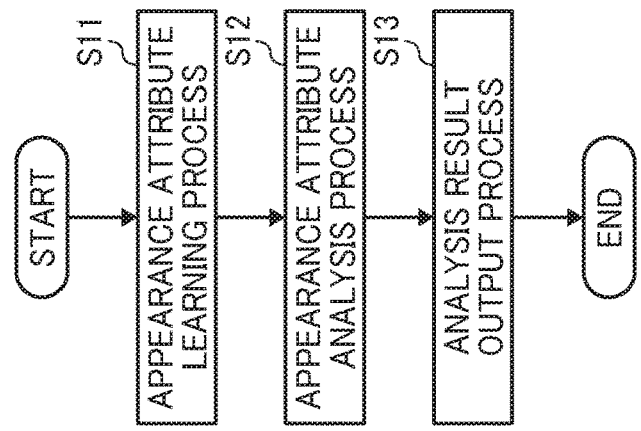

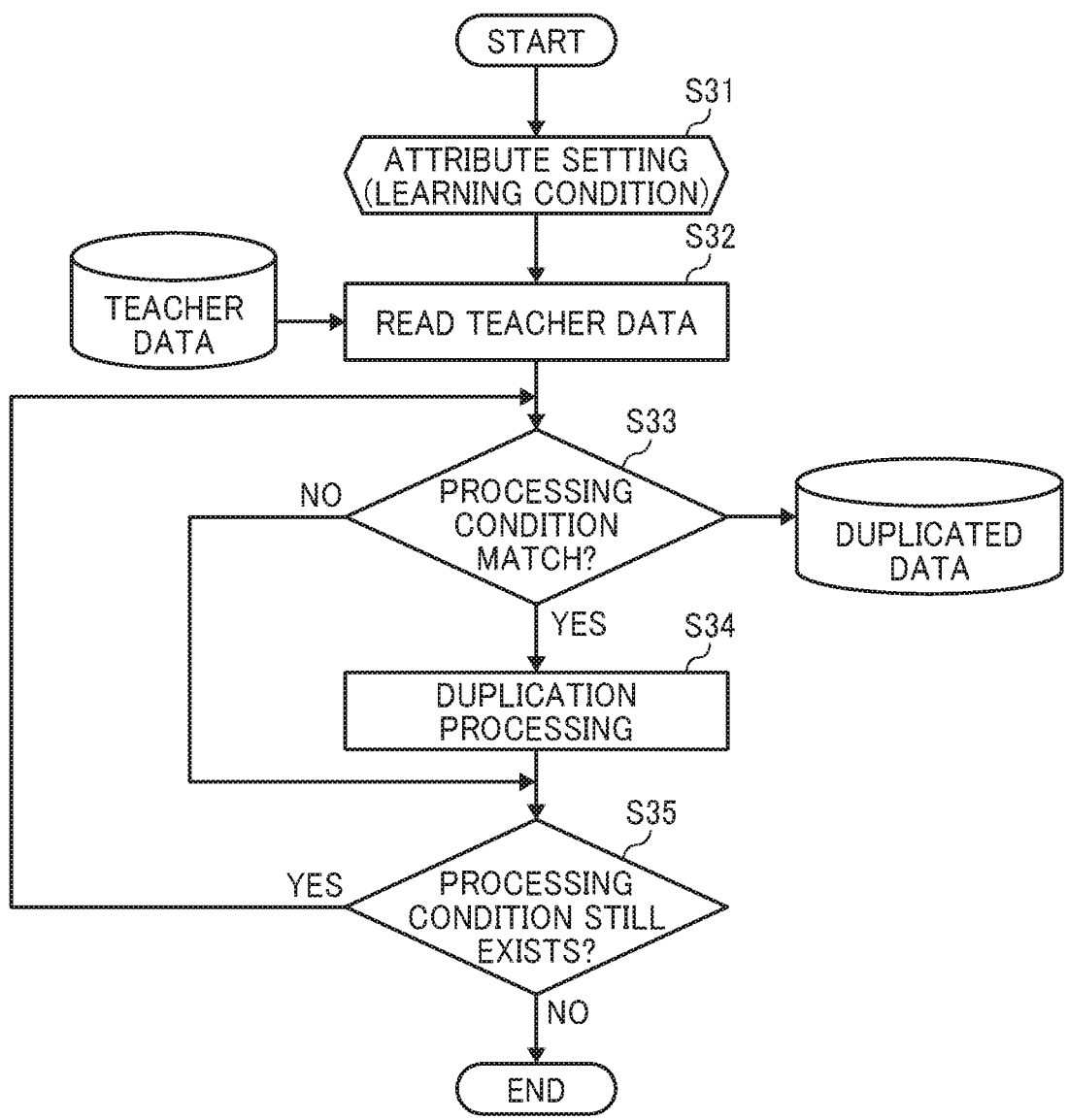

FIG. 7

| PROCESSING CONTENT | PROCESSING 1 | PROCESSING 2 | PROCESSING 3 | PROCESSING 4 | PROCESSING 5 | PROCESSING 6 |
|---|---|---|---|---|---|---|
| | CONTRAST ADJUSTMENT | Salt&Pepper NOISE ADDITION | GAMMA CONVERSION | SMOOTHING | NOISE ADDITION BASE ON GAUSSIAN DISTRIBUTION | INVERSION |
| NUMBER OF IMAGES | 300×2 =600 | 600×2 =1200 | 1200×2 =2400 | 2400×2 =4800 | 4800×2 =9600 | 9600×2 =19200 |

FIG. 8

| APPEARANCE ATTRIBUTE | FEATURE OF CLOTHES | PROCESSING 1 | PROCESSING 2 | PROCESSING 3 | PROCESSING 4 |
|---|---|---|---|---|---|
| A | PLAIN CLOTHES | Salt&Pepper NOISE ADDITION | SMOOTHING | NOISE ADDITION BASE ON GAUSSIAN DISTRIBUTION | INVERSION |
| B | NO-PATTERN CLOTHES | CONTRAST ADJUSTMENT | GAMMA CONVERSION | SMOOTHING | INVERSION |
| C | CLOTHES OF SWEATERS AND SUEDE FABRICS | CONTRAST ADJUSTMENT | GAMMA CONVERSION | NOISE ADDITION BASE ON GAUSSIAN DISTRIBUTION | INVERSION |

TOWN "X" STYLE, TOWN "Y" STYLE, TOWN "Z" STYLE etc.

FIG. 11
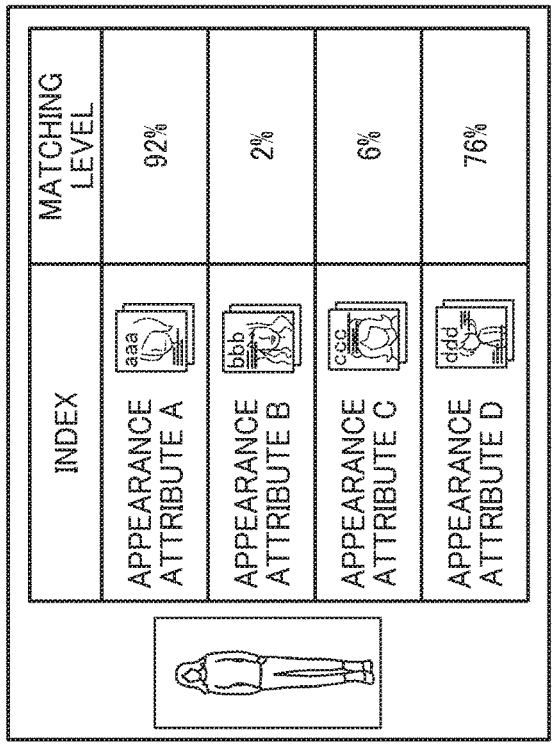
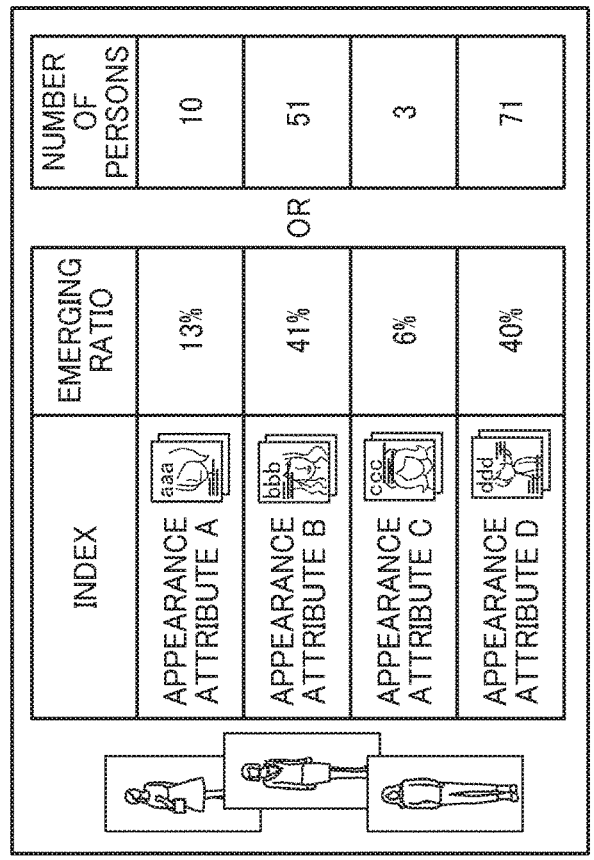
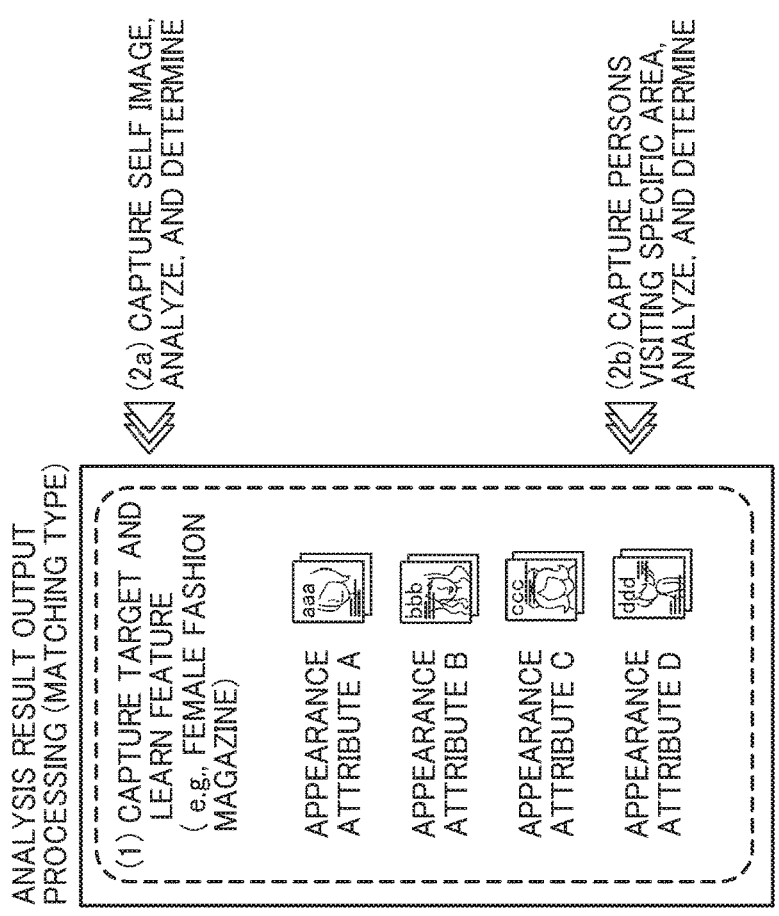

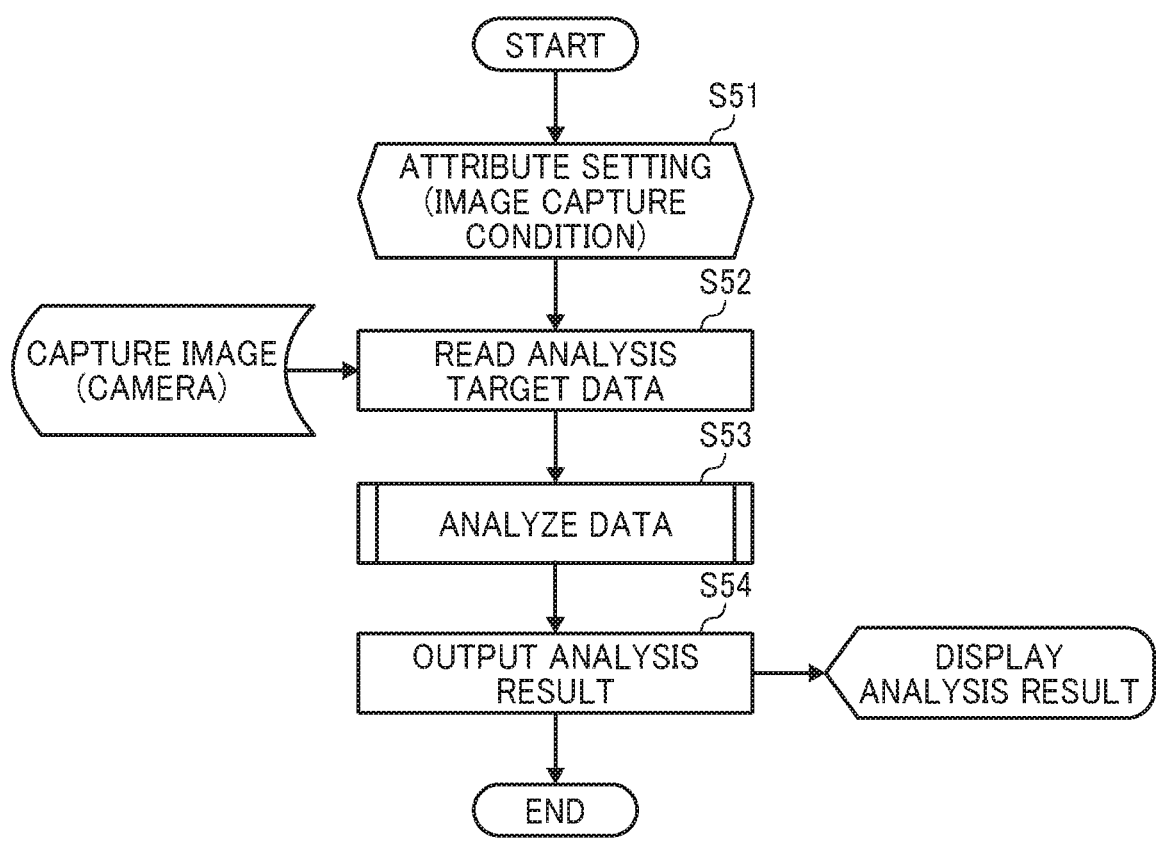

AREA SETTING IN CAPTURED IMAGE

FIG. 21
■ TYPE SETTING
| AREA NAME | AREA DATA | ASSUMED TYPE |
|---|---|---|
| SHELF A | (X1,Y1) – (X2,Y2) | CLEAN STYLE |
| SHELF B | (X3,Y3) – (X4,Y4) | BUSINESS STYLE |
| MIRROR | (X5,Y5) – (X6,Y6) | BUSINESS STYLE |
FIG. 22
■ EXAMPLE OF REPORTS
TRANSITION OF MATCHING (LINE CHART)
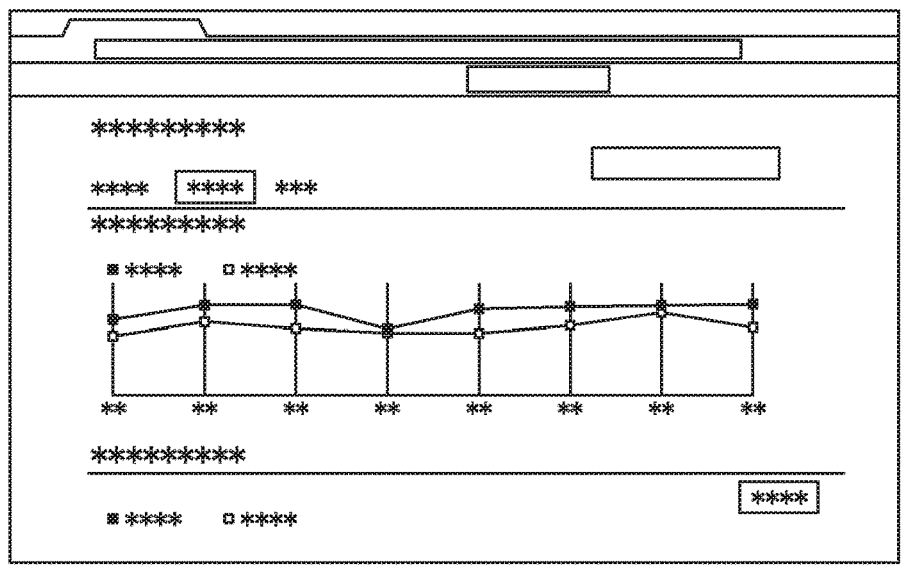
NUMBER OF MATCHED PERSONS (BAR GRAPH)
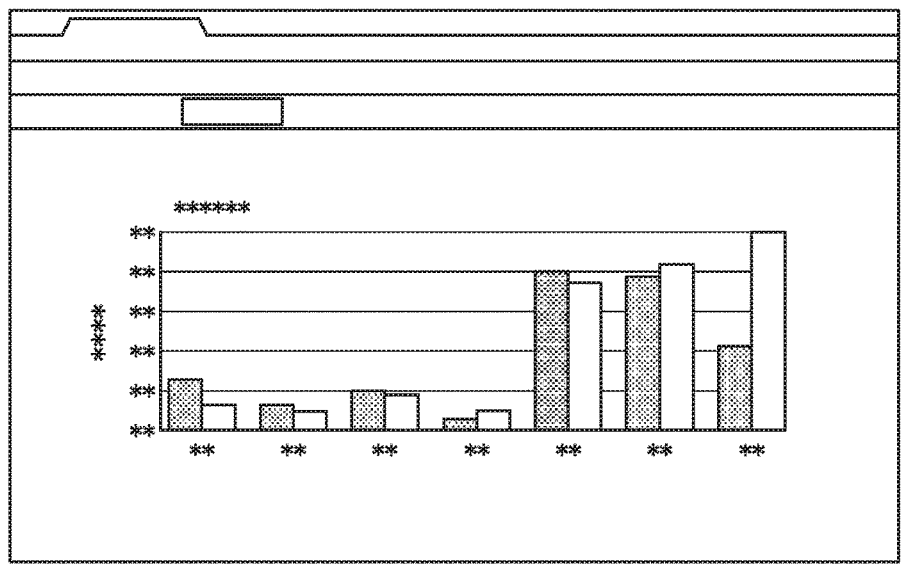

ADVERTISEMENT DEFINITION DATA

| APPEARANCE ATTRIBUTE | ADVERTISEMENT PATTERN (EXAMPLES) |
|---|---|
| MALE: STREET STYLE | GOODS PRESENTATION |
| MALE: BUSINESS STYLE | BUSINESS BAGS |
| FEMALE: MRS. STYLE | OUTDOOR CLOTHES WITH CHILD |
| FEMALE: FEMININE STYLE | FANCY ACCESSORIES |

IMAGE ATTRIBUTE PROCESSING SYSTEM, IMAGE ATTRIBUTE PROCESSING APPARATUS, AND METHOD OF PROCESSING IMAGE ATTRIBUTES

CROSS-REFERENCE TO RELATED APPLICATION

This application claims priority pursuant to 35 U.S.C. § 119(a) to Japanese Patent Application No. 2018-003093, filed on Jan. 12, 2018 in the Japan Patent Office, the disclosure of which is incorporated by reference herein in its entirety.

BACKGROUND

Technical Field

This disclosure relates to an information processing system, an information processing apparatus, and a method of processing information.

Background Art

Conventional image processing apparatuses can acquire images of persons captured by cameras as cloth-wearing images, estimate personal preference of clothes (clothing preferences) of a particular user by referring the acquired plurality of cloth-wearing images, and select and output information on certain clothes that may match clothing preference of the particular user, selected from among a variety of clothes based on the estimated clothing preference of the particular user.

However, the conventional image processing apparatuses estimate a trend of the clothing preference of the particular user in a simple manner. For example, when certain clothes are being worn for many times, those certain clothes are assumed to match the clothing preference of the particular user. When clothes having same or similar colors are being worn for many times, those clothes of the same or similar colors are assumed to match the clothing preference of the particular user. When specific types of clothes are being worn for many times, those specific types of clothes are assumed to match the clothing preference of the particular user.

On the other hand, consumer purchasing behavior can be evaluated using, for example, consumer purchasing behavior models, such as Attention, Interest, Desire, Memory and Action (AIDMA). The AIDMA model defines the consumer purchasing behavior in five steps of "Attention, Interest, Desire, Memory and Action," in which consumers become aware of products in "Attention," consumers have interests in products in "Interest," consumers desire products in "Desirable," consumers have motivation for products in "Motive," and consumers purchase products in "Action." To move the consumers from "Attention" to "Interest," an approach to consumer values (targeting approach) is important or critical. However, the trend of clothing preference of the user that can be estimated using the conventional method described above is not sufficient to analyze values of consumers, such that it was not an effective approach to obtain the values of consumers.

SUMMARY

In one aspect of the present invention, an information processing system is devised. The information processing system includes circuitry configured to store, in a memory, one or more feature value patterns associated with appearance attribute of one or more groups of persons calculated from a plurality of acquired image data using machine learning, in which each one of the groups assumed to have a unique group value being different for each one of the groups, receive image data of a target person input as analysis target data, analyze an appearance attribute of the target person in the image data using the one or more feature value patterns associated with the appearance attribute of the one or more groups stored in the memory, and output a response corresponding to an analysis result of the appearance attribute of the target person.

In another aspect of the present invention, an information processing apparatus is devised. The information processing apparatus includes circuitry configured to store, in a memory, one or more feature value patterns associated with appearance attribute of one or more groups of persons calculated from a plurality of acquired image data using machine learning, in which each one of the groups assumed to have a unique group value being different for each one of the groups, receive image data of a target person input as analysis target data, analyze an appearance attribute of the target person in the image data using the one or more feature value patterns associated with the appearance attribute of the one or more groups stored in the memory, and output a response corresponding to an analysis result of the appearance attribute of the target person.

In another aspect of the present invention, a method of processing information is devised. The method includes analyzing an appearance attribute of a target person in image data input as analysis target data using one or more feature value patterns associated with appearance attribute of one or more groups of persons calculated from a plurality of acquired image data using machine learning and stored in a memory, in which each one of the groups assumed to have a unique group value being different for each one of the groups, and outputting a response corresponding to an analysis result of the appearance attribute of the target person.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 4 illustrates an example of a flowchart of processing of appearance attribute performed by the information processing system according to the embodiment;

FIG. 5 illustrates an example of a flowchart of appearance attribute learning process;

FIG. 6 illustrates an example of a flowchart of duplicating teacher data;

FIG. 7 illustrates an example case of increasing the number of images using processing;

FIG. 8 illustrates another example case of increasing the number of images using processing;

FIG. 11 illustrates an example of a scheme of analysis result output processing for matching type;

FIG. 15 illustrates an example of a flowchart corresponding to example case 1;

FIG. 21 illustrates an example of actual type matching data;

FIG. 22 illustrates an example of a screen image of an analysis result of example case 2;

Figure 1A:
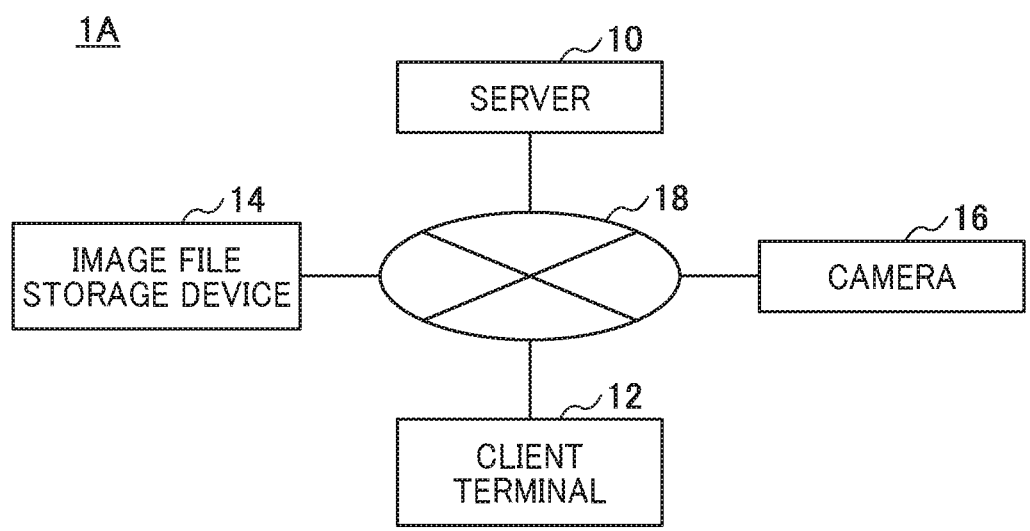
FIGS. 1A and 1B (FIG. 1) are examples of schematic configuration of an information processing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present invention. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, an embodiment of the present invention will be described with reference to the drawings. As above mentioned, an approach to consumer values (targeting approach) is important or critical to move consumers from "Attention" to "Interest" in the consumer purchasing behavior model. However, the conventional approaches for consumer values have been performed based on persona analysis using age, gender, occupation, residence, and so on of consumers.

In this specification, a concept of "appearance attribute" is further adopted, and an approach to consumer values (targeting approach) is performed using the appearance attribute, which is to be described as embodiments of the present invention. The appearance attribute is a method of visualizing values of consumers by directly modeling and analyzing the values of consumers.

For example, an appearance attribute for "flashy clothing preference" is classified as "Town A (e.g., Shibuya) style" and a plurality of images of persons classified as "Town A (e.g., Shibuya) style" is prepared, and then a feature value pattern of the appearance attribute of "Town A (e.g., Shibuya) style" is calculated (computed) by using technique such as machine learning and deep learning (hereinafter referred to as machine learning collectively). Using the same technique, a plurality of feature value patterns associated with appearance attributes of a plurality of styles can be calculated (computed). For example, a feature value pattern of appearance attribute of "Town B (e.g., Ginza) style" corresponding to "standard and formal clothing preference" is calculated (computed). Then, an appearance attribute of a target person in an image (image data, image file), which is analysis target data, is analyzed using the plurality of feature value patterns that have been calculated (computed), and a value of the target person in the image data can be visualized (extracted and identified) based on the analyzed appearance attribute of the target person.

Further, for example, a plurality of feature value patterns associated with appearance attributes of a plurality of styles can be calculated (computed) using information sources, such as magazines. For example, a plurality of female fashion images (e.g., whole body images) classified as fashion can be prepared from a female magazine A, and then a feature value pattern of the appearance attribute of "female magazine A" can be calculated (computed) using a method of machine learning. Similarly, a feature value pattern of the appearance attribute of "female magazine B" and a feature value pattern of the appearance attribute of "female magazine C" can be calculated (computed) using the method of machine learning.

Then, for example, an appearance attribute of a target person entering a particular store can be analyzed using an image of the target person and the appearance attributes calculated (computed) from "female magazine A," "female magazine B" and "female magazine C" to visualize a value of the target person who has entered the particular store. In this way, in the embodiment, the appearance of fashion, to which personal values may be tied, can be classified as the appearance attribute, and values of persons can be visualized based on the calculated (computed) appearance attribute.

Figure 1B:
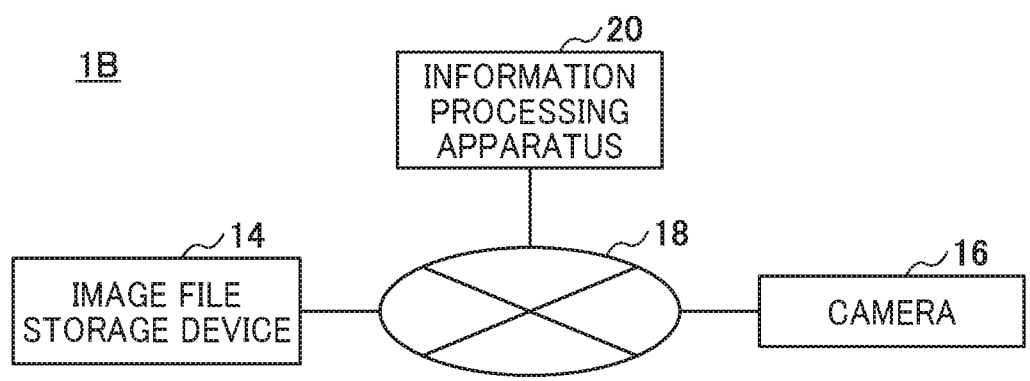

System Configuration:

FIGS. 1A and 1B (FIG. 1) illustrate examples of schematic configurations of an information processing system 1 according to an embodiment. In FIG. 1A, the information processing system 1A includes, for example, a server 10, a client terminal 12, an image file storage device 14, and a camera 16 (image capture device) connected with each other via a network 18, such as the Internet or local area network (LAN). In FIG. 1B, the information processing system 1B includes, for example, the image file storage device 14, the camera 16, and an information processing apparatus 20 connected with each other via the network 18 to communicate data and information.

In the information processing system 1A, a user operates the client terminal 12 and the server 10 performs an appearance attribute learning process, an appearance attribute analysis process, and an analysis result output process to be described later, which can be initiated by an instruction from the client terminal 12. The server 10 calculates or computes a feature value pattern of appearance attribute using teacher data stored in the image file storage device 14. Further, the server 10 analyzes appearance attribute of analysis target data stored in the image file storage device 14 or analysis target data captured by the camera 16, and outputs an analysis result of the appearance attribute of analysis target data to the client terminal 12 or the like.

In the information processing system 1B, a user operates the information processing apparatus 20 to instruct the information processing apparatus 20 to perform the appearance attribute learning process, the appearance attribute analysis process, and the analysis result output process to be described later. The information processing apparatus 20 calculates or computes a feature value pattern of appearance attribute using the teacher data stored in the image file storage device 14. Further, the information processing apparatus 20 analyzes appearance attribute of analysis target data stored in the image file storage device 14 or analysis target data captured by the camera 16, and outputs an analysis result of the appearance attribute of analysis target data.

The server 10 is implemented by a computer, such as personal computer (PC), but not limited thereto. The client terminal 12 is implemented by a smart device, a tablet terminal, a mobile phone, a PC, but not limited thereto. The image file storage device 14 is implemented by, for example, a file server or a network hard disk, but not limited thereto. The camera 16 is implemented by a stationary monitoring camera, a network camera, a single-lens reflex camera, and the like, which can transmit the captured image data via the network 18. The camera 16 is described as an example of image capture devices.

Further, if an image capture device is mounted on the client terminal 12, the image capture device mounted on the client terminal 12 is used without using the camera 16. Further, if the server 10 or a storage device of the client terminal 12 is used instead of the image file storage device 14, the image file storage device 14 can be omitted. Further, the information processing apparatus 20 is implemented by a smart device, a tablet terminal, a cellular phone, a PC, but not limited thereto. Further, the client terminal 12 can be provided for learning environment and the client terminal 12 can be provided for analysis environment as different client terminals.

The configuration of the information processing systems 1A and 1B illustrated in FIGS. 1A and 1B are just examples. For example, at least a part of functions of the server 10 or a part of functions the information processing apparatus 20 can be provided outside the server 10 or the information processing apparatus 20. Further, at least a part of the functions of the client terminal 12 can be provided outside the client terminal 12.

Figure 2:
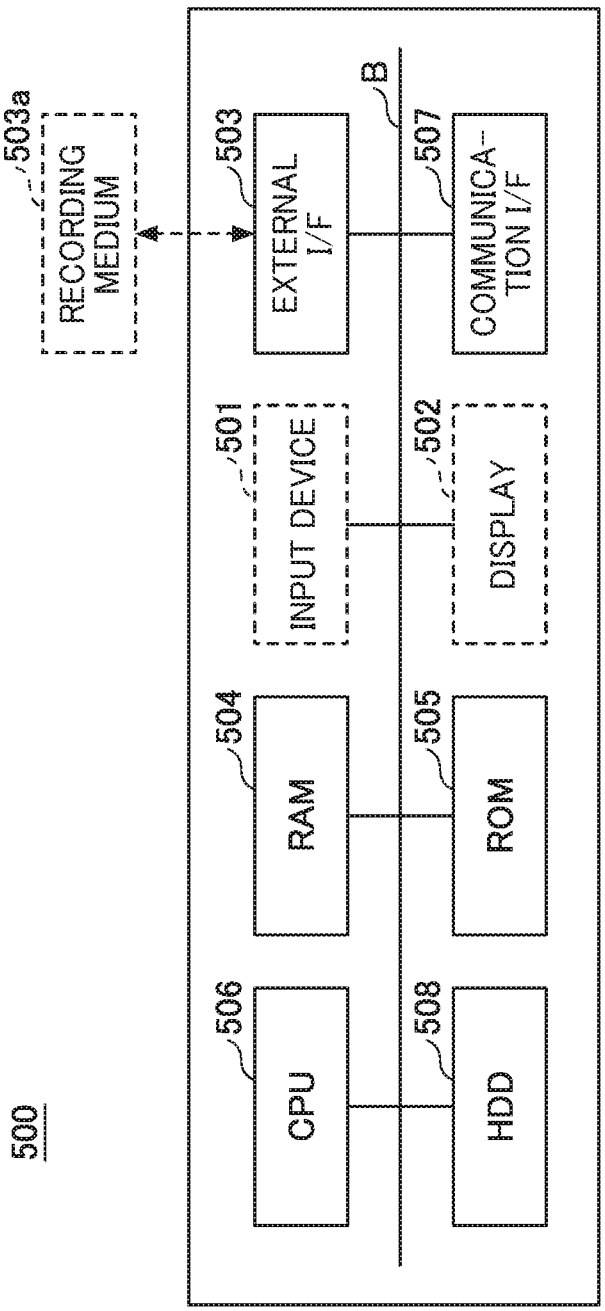
FIG. 2 illustrates an example of a hardware block diagram of a computer.

Hardware Configuration of Computer:

The server 10, the client terminal 12, and the information processing apparatus 20 illustrated in FIG. 1 are implemented by a computer, for example, employing a hardware configuration illustrated in FIG. 2. FIG. 2 illustrates an example of a hardware block diagram of the computer.

As illustrated in FIG. 2, the computer 500 includes, for example, an input device 501, a display 502, an external interface (I/F) 503, a random access memory (RAM) 504, a read only memory (ROM) 505, a central processing unit (CPU) 506, a communication interface (I/F) 507, and a hard disk drive (HDD) 508 connected with each other via a bus B. It should be noted that the input device 501 and the display 502 may be connected as needed.

The input device 501 includes, for example, a keyboard, a mouse, a touch panel, and the like, and is used by a user to input each operation signal. The display 502 includes, for example, a monitor device or the like to display results of processing performed by the computer 500.

The communication I/F 507 is an interface for connecting the computer 500 to various networks. With this configuration, the computer 500 can perform data communication via the communication I/F 507.

Further, the HDD 508 is an example of a non-volatile storage device storing programs and data. The programs and data stored in the HDD 508 include an operating system (OS), which is basic software for controlling the computer 500 entirely, and one or more applications that provide various functions on the OS. Further, the computer 500 can use a drive device such as a solid state drive (SSD) that uses a flash memory as a storage medium instead of the HDD 508.

The external I/F 503 is an interface to an external device. The external device includes, for example, a recording medium 503a and the like. With this configuration, the computer 500 can read data from the recording medium 503a and write data to the recording medium 503a via the external I/F 503. The recording medium 503a includes, for example, a flexible disk, a compact disk (CD), a digital versatile disk (DVD), a secure digital (SD) memory card, a universal serial bus (USB) memory, a subscriber identification module (SIM) card, and the like.

The ROM 505 is an example of a nonvolatile semiconductor memory (storage device) capable of retaining programs and data even when a power supply is turned off. The ROM 505 stores programs and data such as basic input/output system (BIOS), OS settings, and network settings to be executed at the time of activating the computer 500. The RAM 504 is an example of a volatile semiconductor memory (storage device) for temporarily retaining or storing programs and data.

The CPU 506 is a computing device that reads out programs and data from a storage device such as the ROM 505 and/or HDD 508 onto the RAM 504 and executing the programs and data to control the computer 500 entirely including functions of the computer 500. The CPU 506 can be implemented by one processor, a plurality of processors, or circuitry.

The server 10, the client terminal 12, and the information processing apparatus 20 can implement various kinds of processing to be described later using the hardware configuration of the computer 500 illustrated in FIG. 2.

Figure 3:
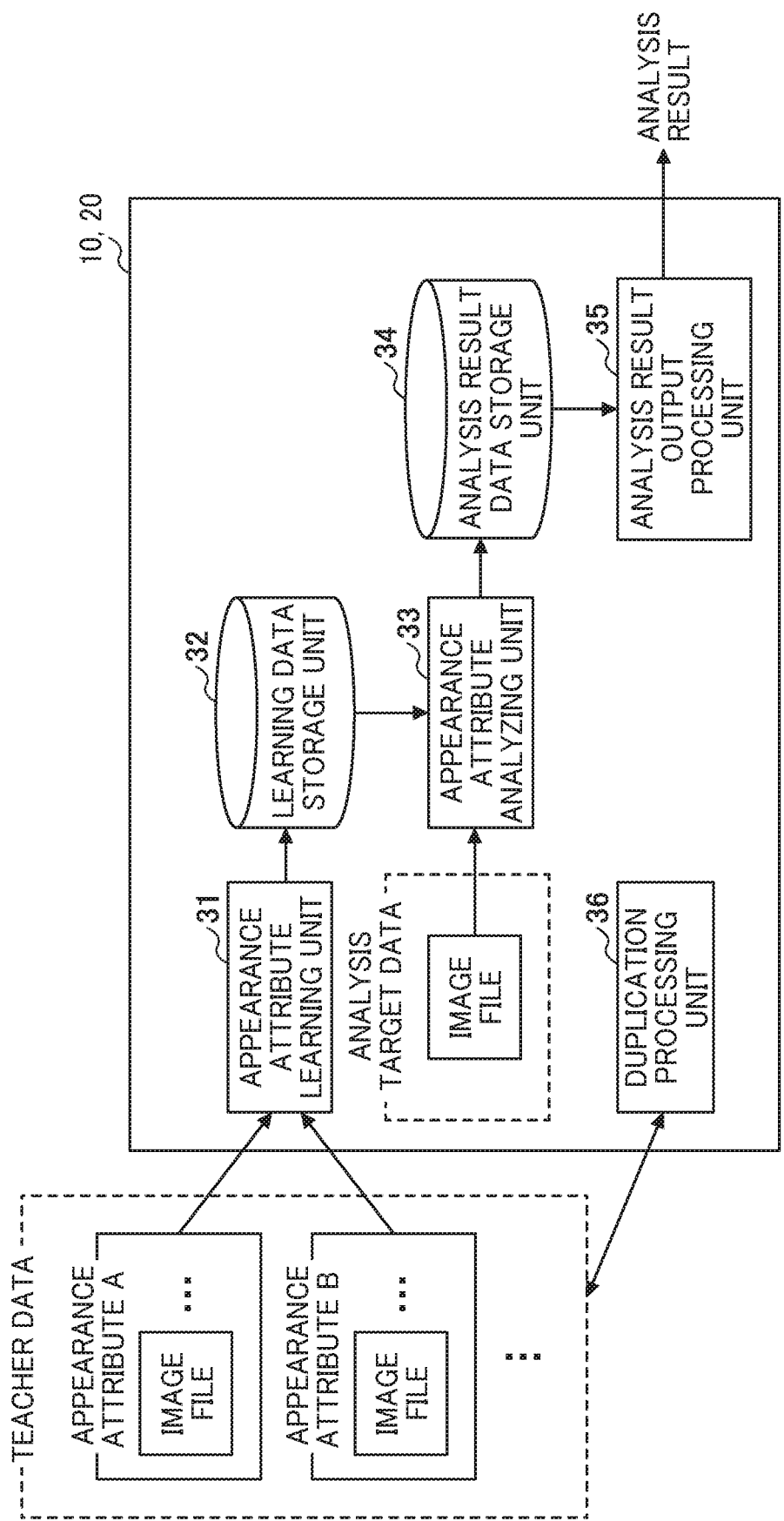
FIG. 3 illustrates an example of a functional block diagram of an information processing system according to the embodiment.

Software Configuration:

Each of the information processing systems 1A and 1B implements, for example, a functional configuration illustrated in FIG. 3. FIG. 3 illustrates an example of a functional block diagram of the information processing system 1 according to the embodiment. The configuration of the functional configuration illustrated in FIG. 3 appropriately omits the description not required for the embodiment. Hereinafter, the information processing system 1A is described as one example.

As illustrated in FIG. 3, the server 10 includes, for example, an appearance attribute learning unit 31, a learning data storage unit 32, an appearance attribute analyzing unit 33, an analysis result data storage unit 34, an analysis result output processing unit 35, and a duplication processing unit 36.

The appearance attribute learning unit 31 performs the appearance attribute learning process, to be described later, to calculate or compute a plurality of feature value patterns from teacher data using the technique of machine learning. The appearance attribute learning unit 31 stores the calculated or computed feature value patterns in the learning data storage unit 32.

For example, the appearance attribute learning unit 31 can calculate or compute a feature value pattern of appearance attribute "A" by inputting a plurality of image files, in which persons that are to be classified as the appearance attribute "A" exist, using the technique of machine learning.

The appearance attribute analyzing unit 33 performs the appearance attribute analysis process, to be described later, to analyze the appearance attribute of one or more target persons in one or more image files input as analysis target data using the feature value patterns calculated and stored in the learning data storage unit 32. The appearance attribute analyzing unit 33 stores analysis result data in the analysis result data storage unit 34.

The analysis result output processing unit 35 performs the analysis result output processing, to be described later, to output information such as the appearance attribute of one or more target persons in one or more image files input as the analysis target data, and the value corresponding to the appearance attribute as an analysis result using the analysis result data stored in the analysis result data storage unit 34.

The duplication processing unit 36 duplicates the teacher data, to be described later, to increase the number or amount of the teacher data.

Processing:

Each of the information processing systems 1A and 1B performs the appearance attribute processing, for example, using the procedure illustrated in FIG. 4. FIG. 4 illustrates an example of a flowchart of the appearance attribute processing performed by the information processing system 1 according to the embodiment.

In step S11, the appearance attribute learning unit 31 calculates or computes a plurality of feature value patterns associated with appearance attribute from the input teacher data, and then stores the plurality of calculated feature value patterns in the learning data storage unit 32. The details of the appearance attribute learning process in step S11 will be described later.

In step S12, the appearance attribute analyzing unit 33 analyzes the appearance attribute of a target person in an image file or data input as analysis target data using the feature value patterns stored in the learning data storage unit 32, and then stores an analysis result data of the appearance attribute of the target person in the image file or data in the analysis result data storage unit 34. The details of the appearance attribute analysis process in step S12 will be described later.

In step S13, the analysis result output processing unit 35 outputs information such as the appearance attribute of the target person in the image file or data input as the analysis target data using the analysis result data stored in the analysis result data storage unit 34 as an analysis result. The details of the analysis result output process in step S13 will be described later.

FIG. 5 illustrates an example of a flowchart of the appearance attribute learning process.

In step S21, the appearance attribute learning unit 31 receives parameter setting required for the machine learning in accordance with attribute setting (learning condition).

In step S22, the appearance attribute learning unit 31 reads images of persons classified as one appearance attribute by an operator (user) as the teacher data.

In step S23, the appearance attribute learning unit 31 recognizes features of the teacher data by performing the machine learning, calculates or computes the feature value patterns, and then stores the calculated feature value patterns in the learning data storage unit 32.

In step S24, the appearance attribute learning unit 31 determines whether the teacher data, not processed by the machine learning in step S23, still exists, which means the appearance attribute learning unit 31 determines whether all of the teacher data, prepared for the appearance attribute learning process, are processed by the machine learning in step S23. If some of the teacher data, prepared for the appearance attribute learning process, is not yet processed by the machine learning in step S23 (step S24: YES), the appearance attribute learning unit 31 returns the sequence to step S22 and continues the sequence. On the other hand, if the teacher data, prepared for the appearance attribute learning process, are completely processed by the machine learning in step S23, that is, all of the teacher data are processed by the machine learning (step S24: NO), the appearance attribute learning unit 31 ends the sequence illustrated in FIG. 5.

Further, it is necessary to prepare sufficient number of images as a set of teacher data to secure accuracy (to prevent over-learning) for the machine learning used for image recognition. If sufficient number of images are not available, a method of FIG. 6 can be used to increase the number of images by modifying a tagged image group, such as an image group of persons classified as one appearance attribute by the operator (user). The processing such as modifying includes, for example, contrast adjustment, gamma conversion, smoothing, noise addition, inversion, enlargement/reduction, or the like.

In the contrast adjustment, image contrast (bright/dark difference) is enhanced or decreased to change or convert sharpness of image and intensity of color. In the gamma conversion, the luminance value is changed by changing the main gradation (gamma) of the image. In the smoothing, an image is smoothed using a smoothing filter. In the noise addition, a noise is added by adding a generation value based on a Gaussian distribution, or an impulse noise is added. In the inversion, an image is inverted between left and right, and/or between horizontally and vertically. In the enlargement/reduction, a part of an image is enlarged or reduced.

FIG. 7 illustrates an example case of increasing the number of images by performing the processing such as modifying. In FIG. 7, the number of images is increased from 300 images to 19,200 images by performing processing 1 to 6. In general, a method of increasing the number of images by performing the processing illustrated in FIG. 7 can be standardized, and the same increase method can be used for all of the tagged image groups. In the embodiment, the method of increasing the number of images is changed depending on types of tagged image groups (appearance attribute) as follows.

FIG. 8 illustrates another example of increasing the number of images by performing the processing such as modifying. In FIG. 8, a method of the processing is changed depending on the types of tagged image groups (appearance attribute). Further, the processing method and the processing order of FIG. 8 are one example. For example, if an image group including images of "plain clothes" as the main feature of clothes is processed by the contrast enhancement and gamma enhancement (hard adjustment), color is emphasized, which is not suitable as the teacher data of the plain clothes.

Further, if an image group including images of "no-pattern clothes" as the main feature of clothes is added with noise, the added noise appears as a pattern on clothes (pattern) so that images not suitable as the teacher data of "no-pattern clothes" are generated.

Further, if an image group including images of "clothes of sweaters and suede fabrics" as the main feature of clothes is processed by the smoothing process, the three-dimensional quality of fabrics is lost, and images not suitable as the teacher data of the clothes of sweaters and suede fabrics are generated.

Accordingly, as illustrated in the flowchart of FIG. 6, by changing the method of increasing the number of teacher data depending on the types of appearance attribute, a set of teacher data capable of performing a higher precision machine learning can be generated with sufficient number of teacher data.

FIG. 6 illustrates an example of a flowchart of duplicating the teacher data. The duplication processing unit 36 that performs a sequence of duplicating the teacher data illustrated in FIG. 6 can be provided in the client terminal 12 in the case of the information processing system 1A.

In step S31, the duplication processing unit 36 receives the setting of processing conditions (duplication processing such as contrast adjustment, gamma conversion, smoothing, noise addition, inversion, enlargement/reduction) for each type of appearance attribute illustrated in FIG. 8 in accordance with the attribute setting (learning condition).

In step S32, the duplication processing unit 36 reads image data of persons classified as one appearance attribute as the teacher data.

In step S33, if there is a processing condition that matches the read appearance attribute (S33: YES), the duplication processing unit 36 proceeds the sequence to step S34 and performs the duplication processing based on the matched processing condition and adds duplicated data to the teacher data.

If there is no processing condition that matches the read appearance attribute (S33: NO), the duplication processing unit 36 skips step S34. In step S35, it is determined whether any processing condition still exists. The sequence of steps S33 to S35 is repeated until the processing conditions are exhausted.

Figure 9:
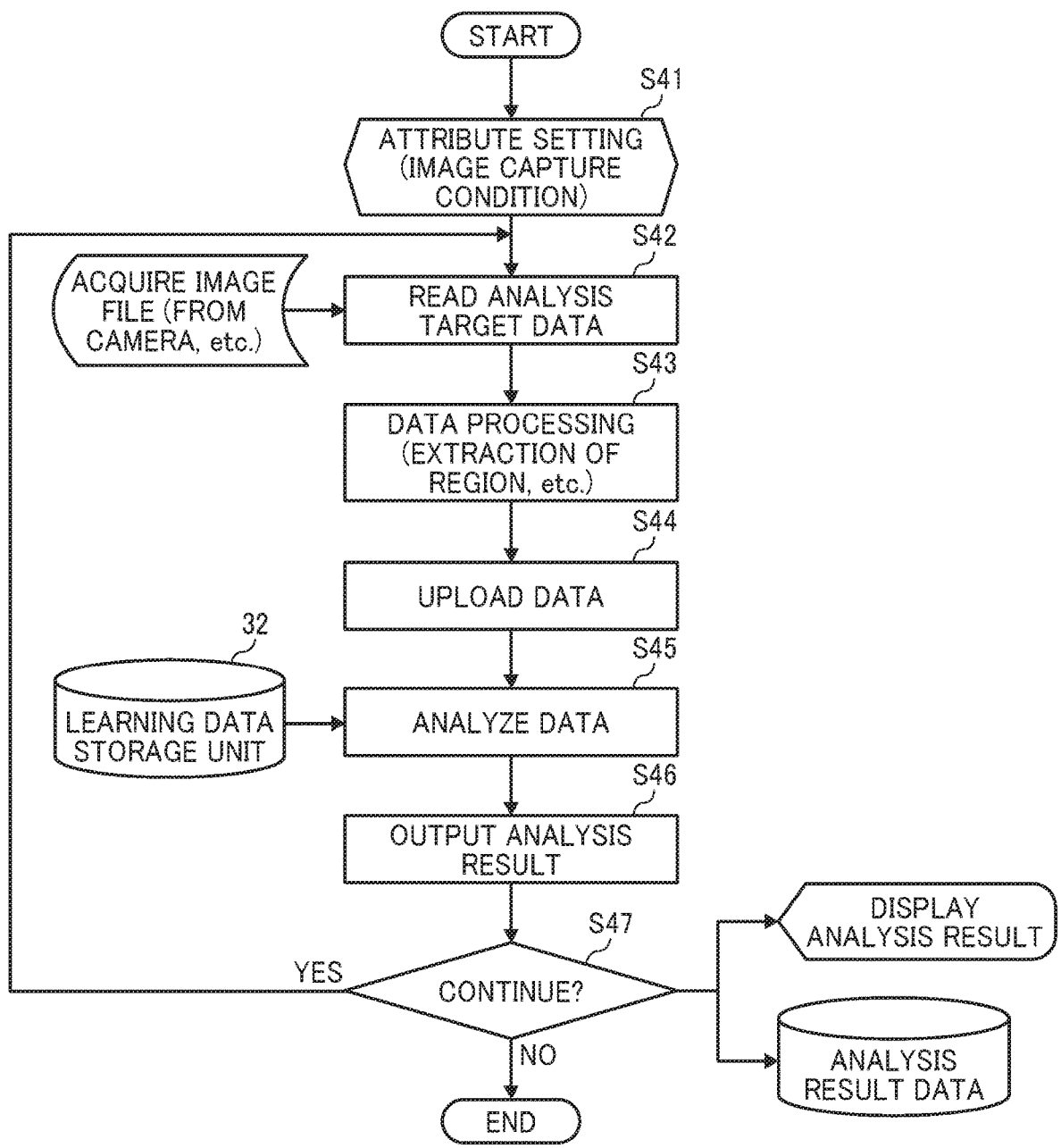
FIG. 9 illustrates an example of a flowchart of appearance attribute analysis processing and analysis result output processing.

FIG. 9 illustrates an example of a flowchart of the appearance attribute analysis processing and the analysis result output processing. The sequence of FIG. 9 also includes the processing performed by the client terminal 12.

In step S41, the client terminal 12 receives parameter setting required for image capturing in accordance with the attribute setting (image capture condition).

In step S42, the client terminal 12 reads an image file from the image file storage device 14 or the camera 16 as analysis target data.

In step S43, the client terminal 12 performs data processing, such as an extracting a region required for analyzing the appearance attribute from the read image file and changing the resolution of the read image file.

In step S44, the client terminal 12 uploads the image file, having received the data processing in step S43, to the appearance attribute analyzing unit 33 in the server 10 as the analysis target data.

In step S45, the appearance attribute analyzing unit 33 analyzes a matching level of the target person in the image file input as the analysis target data with various appearance attributes using the feature value patterns stored in the learning data storage unit 32.

In step S46, the analysis result output processing unit 35 outputs or transmits the analysis result to one or more devices to display the analysis result on the one or more devices and/or to store the analysis result in the one or more devices.

In step S47, it is determined whether the appearance attribute analysis processing and the analysis result output processing are continued. The sequence of steps S42 to S47 is repeated until an operator (user) instructs the ending of continuation of the sequence (step S47: NO).

Figure 10:
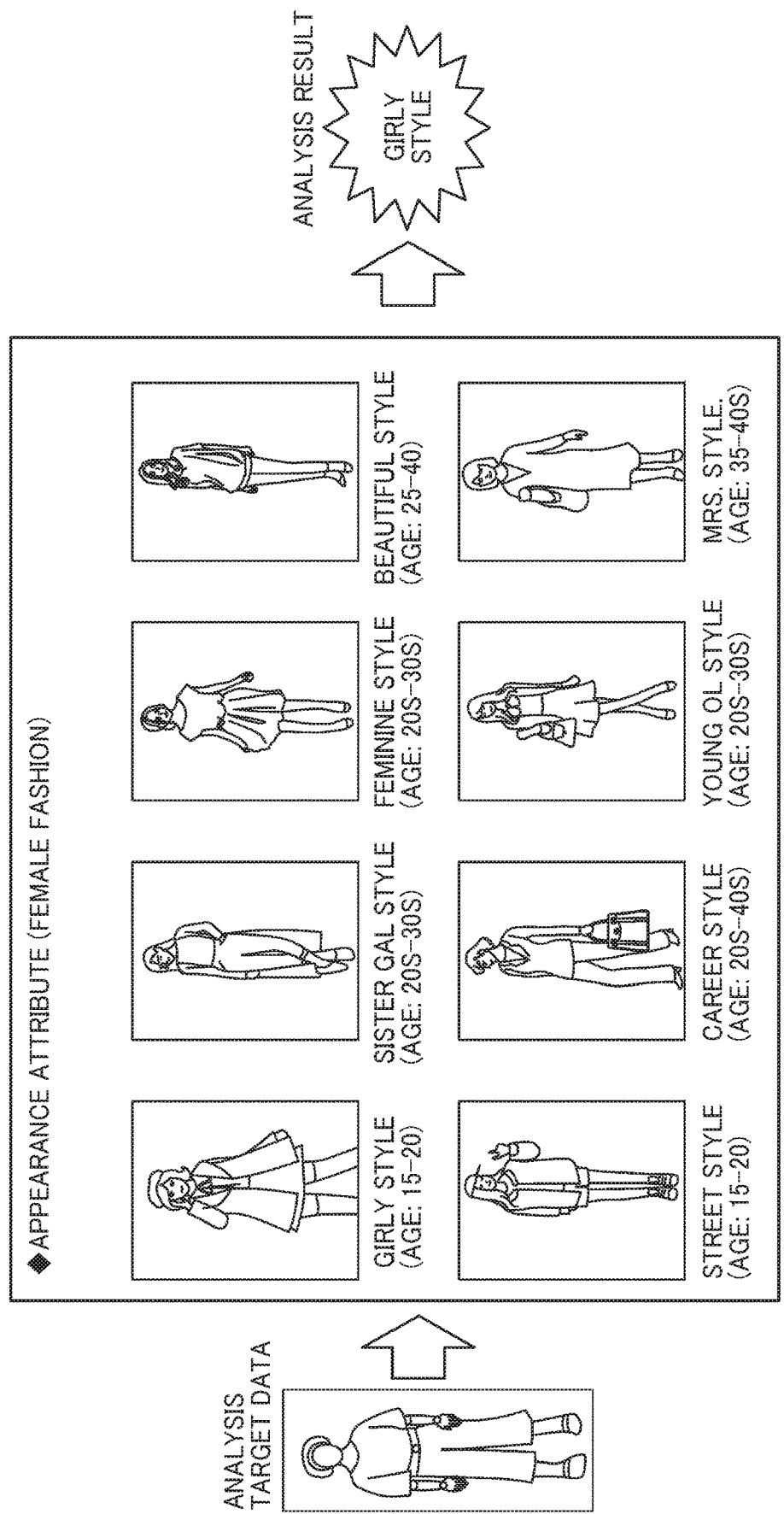
FIG. 10 illustrates an example of a scheme of appearance attribute analysis processing.

FIG. 10 illustrates an example of a scheme of the appearance attribute analysis processing. In an example of FIG. 10, the appearance attribute includes, for example, girly style, sister gal style, feminine style, beautiful style, street style, career style, young office lady (OL) style, and Mrs. style. The appearance attribute analyzing unit 33 reads the analysis target data (set at the left end in FIG. 10), and then analyzes the matching level of the analysis target data with various appearance attributes using the feature value patterns. FIG. 10 illustrates an example case that the appearance attribute of the target person in the analysis target data is analyzed as "girly style."

The analysis result output processing in step S13 outputs, for example, an analysis result of matching type, correlation type, value indicator type.

FIG. 11 illustrates an example of a scheme of the analysis result output processing for matching type. The analysis result output process for the matching type is provided as, for example, an application of a smartphone so that a user can check fashion of persons including the user. The analysis result output processing unit 35 outputs the matching level of the analysis target data with various appearance attributes by analyzing the image data captured for the user using the appearance attribute analyzing unit 33 as an analysis result. In an example of FIG. 11, the matching level of the analysis target data with the appearance attribute "A" becomes the highest.

Further, the analysis result output processing for the matching type can be used as an analysis tool for particular stores such as apparel and food stores. The analysis result output processing unit 35 analyzes the appearance attribute of one or more target persons visiting a particular area, analyzed from the image file received from the camera 16 by the appearance attribute analyzing unit 33, and outputs an emerging ratio and the number of persons in the particular area as an analysis result. The particular stores such as apparel and food stores can use the analysis results for setting or changing interior decoration patterns and display patterns.

Figure 12:
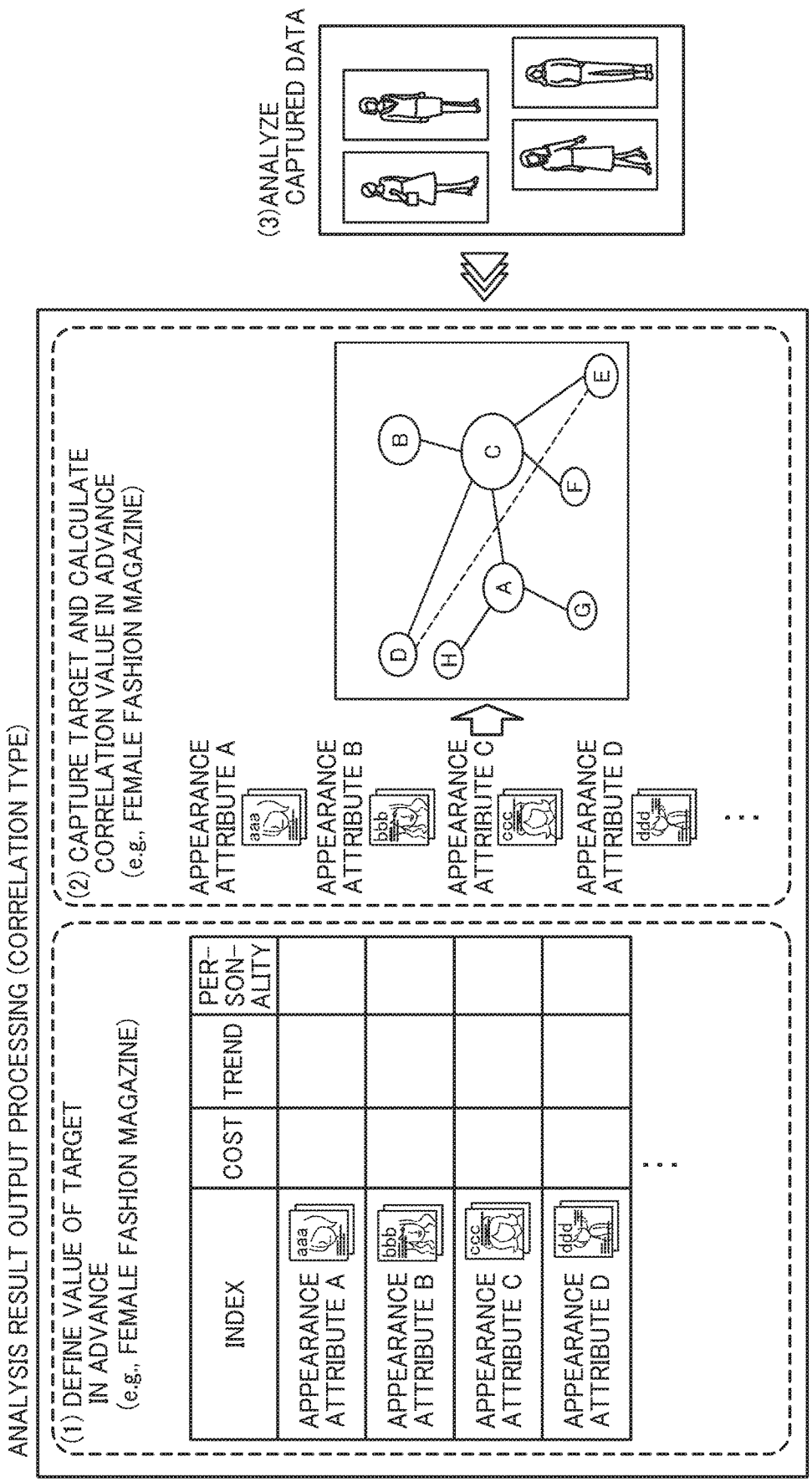
FIG. 12 illustrates an example of a scheme of analysis result output processing for correlation type.

FIG. 12 illustrates an example of a scheme of the analysis result output processing for the correlation type. The analysis result output processing for the correlation type can be utilized, for example, in particular stores, such as apparel stores. In the analysis result output processing for the correlation type, by defining a value of each appearance attribute, correlation values among various appearance attributes can be calculated, and then a correlation map indicating a correlation level among various appearance attributes can be created in advance. In an example case of FIG. 12, the correlation map indicates that the appearance attribute A and the appearance attributes C, G and H have a correlation level indicating that the appearance attribute A and the appearance attributes C, G and H have a closer correlation, and indicates that it is worthwhile to recommend goods prepared for the appearance attributes C, G and H to a person analyzed to have the appearance attribute A.

The analysis result output processing for the correlation type can be used to propose to the target person, not only goods specifically prepared for the analyzed appearance attribute of the target person, but also another goods (e.g., fashion and accessories) prepared for another appearance attribute having the closer correlation with the analyzed appearance attribute of the target person. Further, the value associated with each appearance attribute can be defined by analyzing image files, received from the camera 16 that captures images of particular areas, such as Town A (e.g., Shibuya), Town C (e.g., Harajuku) and Town D (e.g., Daikanyama), using the appearance attribute learning unit 31, in which the value can be defined for each of the particular area, such as Town A (e.g., Shibuya) style, Town C (e.g., Harajuku) style and Town D (e.g., Daikanyama) style.

Figure 13:
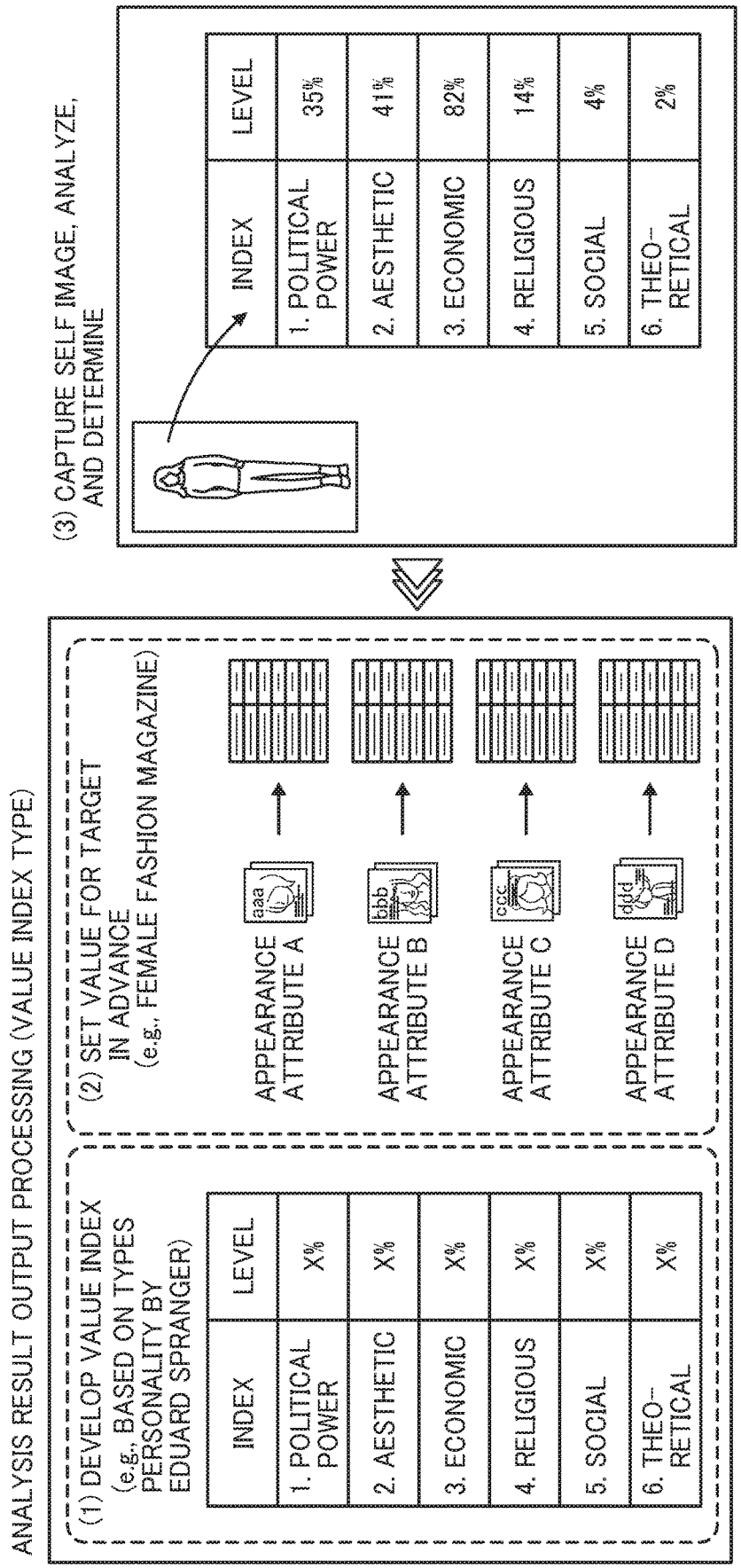
FIG. 13 illustrates an example of a scheme of analysis result output processing for value indicator type.

FIG. 13 illustrates an example of a scheme of the analysis result output processing for the value indicator or value index type. For example, the analysis result output processing for the value indicator type can be performed by installing an application on a smartphone of a user, with which the user checks his or her fashion. In the analysis result output processing for the value indicator type, a value index is developed, and a value of each appearance attribute is defined based on the value index in advance, with which the appearance attribute analyzing unit 33 outputs a measurement of the value index of the appearance attribute analyzed from the captured data of the user as an analysis result.

Hereinafter, example cases using the appearance attribute according to the embodiment are described.

Example Case 1:

Example case 1 determines the appearance attribute. Example case 1 requires the execution of learning of the appearance attribute as a preliminary preparation condition. For example, the appearance attribute of ages and sexes (male: 20s, 30s, 40s, and others, female: 20s, 30s, 40s, and others) and the appearance attribute of category-by-category attribute (male: super casual, casual, sporty, street, clean, American casual, business; woman: high fashion, Mrs., career, young OL, beautiful, basic, feminine, girly, young girl, feminine casual, back street, and street) are learned by the appearance attribute learning unit 31. Then, in example case 1, the appearance attribute analyzing unit 33 analyzes the appearance attribute of a target person in an image file or data captured by the camera 16 and outputs the matching level of the appearance attribute of the target person with the various appearance attributes as a response corresponding to an analysis result of the appearance attribute of the target person. In this description, the response based on the analysis result includes, for example, the analysis result itself and information or material that is determined based on the analysis result.

Figure 14:
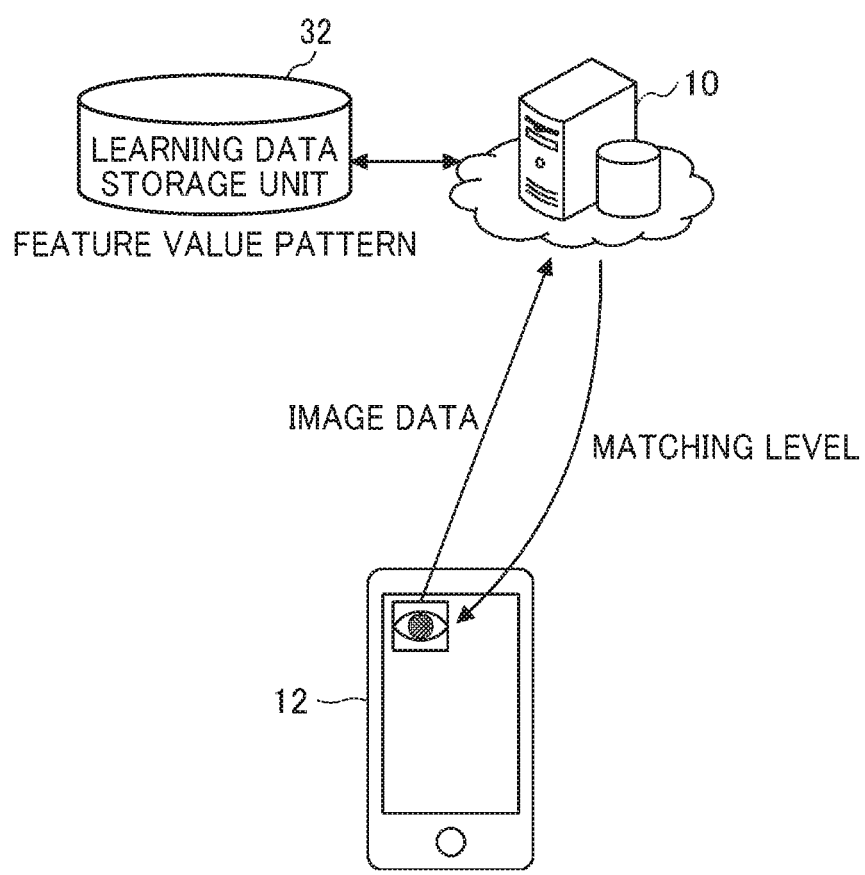
FIG. 14 illustrates an example of a schematic configuration of a system corresponding to example case 1.

FIG. 14 illustrates an example of a schematic configuration a system corresponding to example case 1. In the system configuration illustrated in FIG. 14, the appearance attribute of the target person in the image file or data uploaded from the client terminal 12 is analyzed by the server 10, and the matching level of the appearance attribute of the target person with the various appearance attributes is displayed on the client terminal 12 as an analysis result.

FIG. 15 illustrates an example of a flowchart corresponding to example case 1.

In step S51, the client terminal 12 receives parameter setting required for image capturing in accordance with the attribute setting (image capture condition).

In step S52, the client terminal 12 reads the image data including the target person, which is a target of analyzing the appearance attribute, and uploads the image data to the server 10.

In step S53, the appearance attribute analyzing unit 33 in the server 10 analyzes the appearance attribute of the target person included in the image data uploaded from the client terminal 12 using the feature value patterns stored in the learning data storage unit 32.

Figure 16:
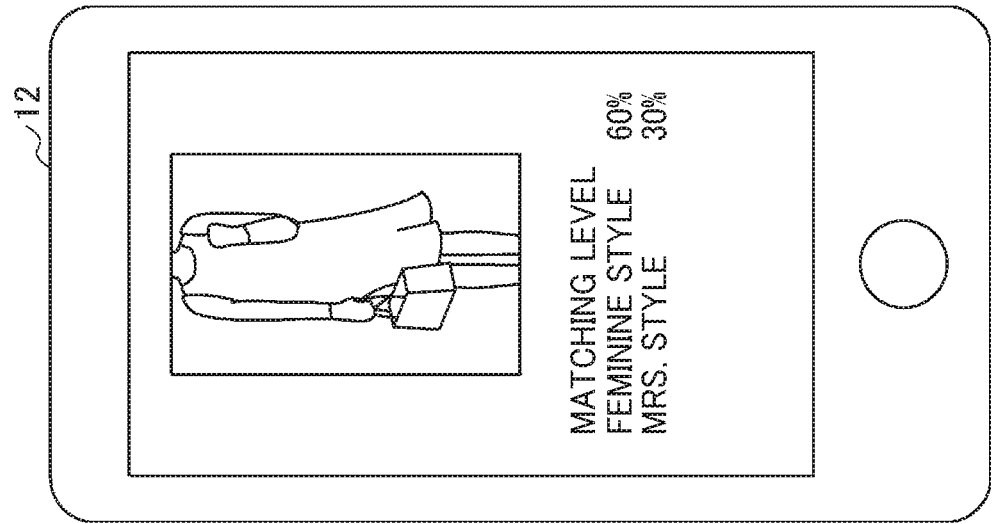
FIG. 16 illustrates an example of a screen image output as an analysis result of example case 1.

In step S54, the analysis result output processing unit 35 transmits the matching level of the appearance attribute of the target person with various appearance attributes to the client terminal 12 as an analysis result, and then outputs and displays the analysis result on the client terminal 12 as illustrated in FIG. 16. FIG. 16 illustrates an example of a screen image outputting or displaying the analysis result of the example case 1. The screen image (FIG. 16) displaying the analysis result displays the matching level of the appearance attribute of the target person with various appearance attributes. In this case, the response corresponds to the analysis result.

Example Case 2:

Example case 2 compares the appearance attribute (actual type) which is pre-set in an area set in an image file to be captured by the camera 16 and the appearance attribute of the target person captured in the area analyzed from the image file or data captured by the camera 16. In example case 2, it is necessary to set up actual type matching data, which will be described later, in addition to the preliminary preparation conditions of example case 1. In example case 2, the client terminal 12 sets the actual type matching data, the server 10 analyzes the appearance attribute of the target person captured in the area set in the image data captured by the camera 16, and displays a comparison result of the analysis result of the appearance attribute of the target person and the actual type matching data on the client terminal 12.

Figure 17:
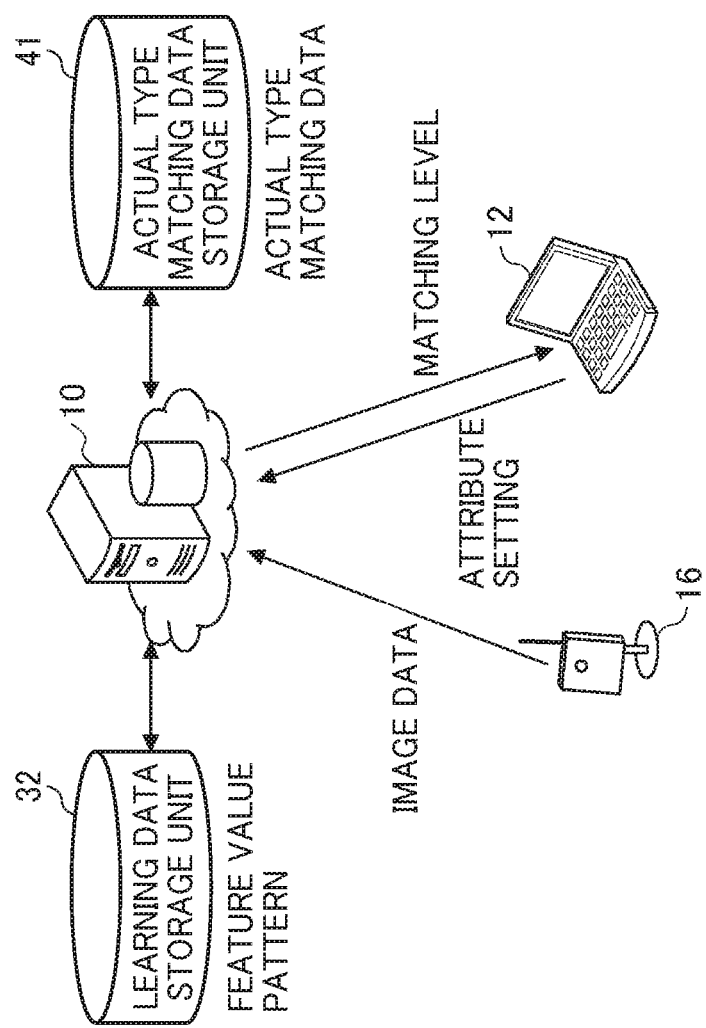
FIG. 17 illustrates an example of a schematic configuration a system corresponding to example case 2.

FIG. 17 illustrates an example of a schematic configuration a system corresponding to example case 2. In the system configuration illustrated in FIG. 17, the server 10 analyzes the appearance attribute of the target person captured in the area set in the image data uploaded from the camera 16, compares the analysis result of the appearance attribute of the target person and the actual type matching data, and displays a comparison result on the client terminal 12. The actual type matching data is set, for example, from the client terminal 12 to the server 10.

Figure 18:
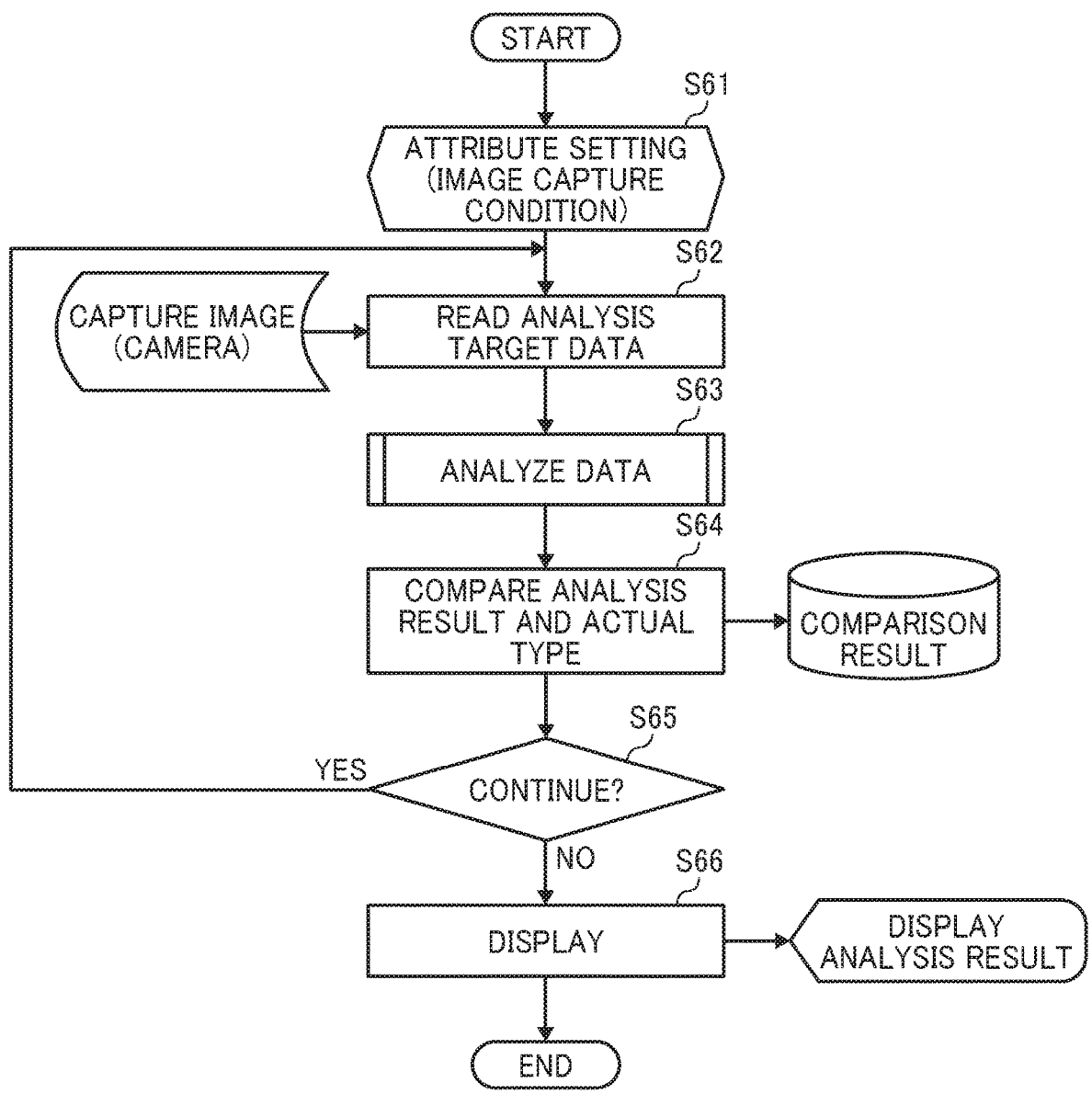
FIG. 18 illustrates an example of a flowchart corresponding to example case 2.

FIG. 18 illustrates an example of a flowchart corresponding to example case 2.

In step S61, the camera 16 receives parameter setting required for image capturing in accordance with the attribute setting (image capture condition) from a user.

In step S62, the camera 16 uploads the image data capturing the area set for the actual type matching data to the server 10.

In step S63, the appearance attribute analyzing unit 33 analyzes the appearance attribute of the target person captured in the area set in the image data uploaded from the camera 16 using the feature value patterns stored in the learning data storage unit 32.

In step S64, the analysis result output processing unit 35 compares the appearance attribute of the target person analyzed by the appearance attribute analyzing unit 33 and the actual type associated with the area set for the actual type matching data, and displays, for example, an analysis result output (see FIG. 22) on the client terminal 12 in step S66.

In step S65, it is determined whether the sequence is to be continued.

FIG. 22 illustrates an example of a screen image of an analysis result of example case 2. The screen image of the analysis result (FIG. 22) displays a report of a transition of the matching level of the analyzed appearance attribute and the actual type using a line chart, and a report of a transition of the number of persons matched to the actual type using a bar graph.

Figure 19:
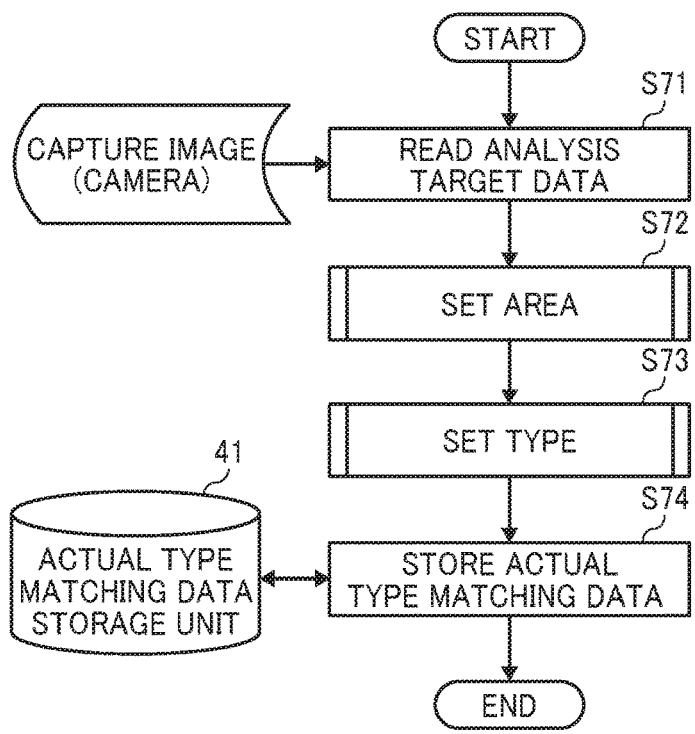
FIG. 19 illustrates an example of a flowchart illustrating the steps of setting actual type matching data.

FIG. 19 illustrates an example of a flowchart illustrating the steps of setting the actual type matching data.

In step S71, the client terminal 12 reads image data from the camera 16.

Figure 20:
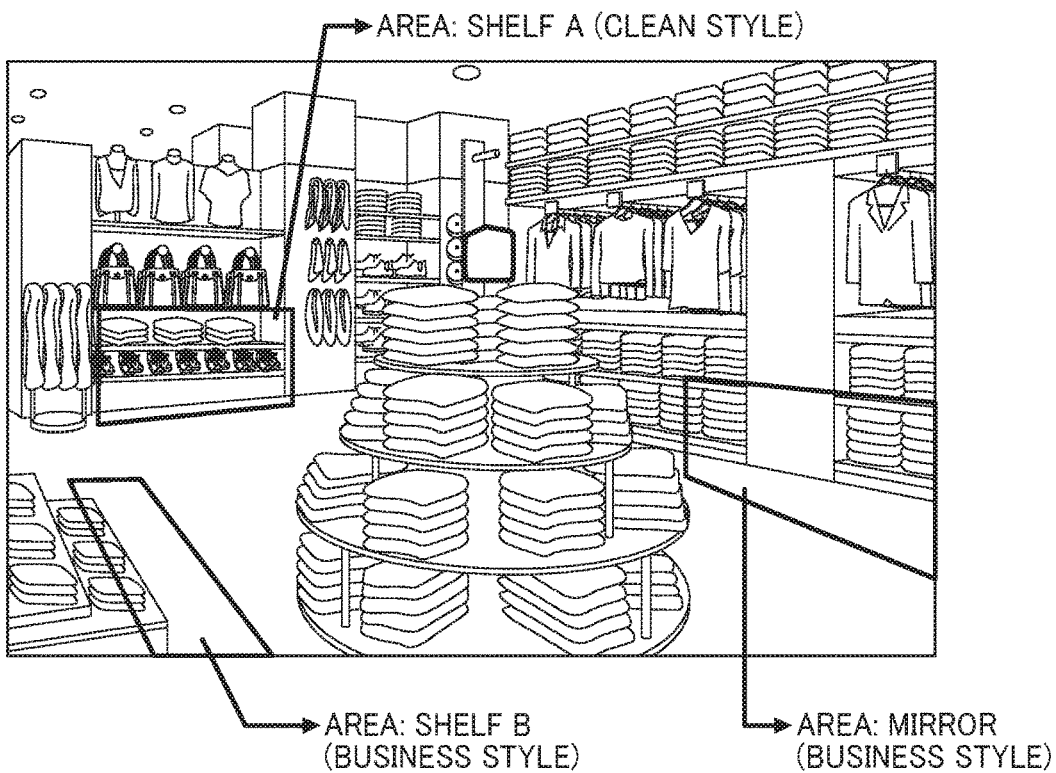
FIG. 20 illustrates an example of a schematic view of setting actual type matching data.

In step S72, for example, the client terminal 12 receives a setting of an area for the actual type matching data as illustrated in FIG. 20.

In step S73, for example, the client terminal 12 receives a setting of an actual type for the actual type matching data as illustrated in FIG. 20.

FIG. 20 illustrates an example of a schematic view of setting the actual type matching data. FIG. 20 illustrates an example image of image data read from the camera 16 and displayed on the client terminal 12. In FIG. 20, a shelf A, a shelf B and a mirror are examples of the areas set for the actual type matching data, and "clean style" is set as the actual type in the area of the shelf A, "business style" is set as the actual type in the areas of the shelf B and the mirror. In step S74, the client terminal 12 stores, for example, the actual type matching data (FIG. 21) in the actual type matching data storage unit 41.

FIG. 21 illustrates an example of the actual type matching data. The actual type matching data (FIG. 21) includes data items, such as area name, area data, and assumed type. The area name, which is a name of the set area, is an example of identification information identifying the set area. The area data, such as coordinate data, is an example of information that can uniquely identify a specific area on the image data read from the camera 16. The assumed type is an example of information indicating the actual type.

Example Case 3:

Example case 3 determines the appearance attribute and correlates the appearance attribute with advertisement. In example case 3, it is necessary to set up advertisement definition data to be described later in addition to the preliminary preparation condition of example case 1 as the preliminary preparation condition. In example case 3, the appearance attribute analyzing unit 33 analyzes the appearance attribute of the target person in the image file or data captured by the camera 16 and outputs advertisement in accordance with the analysis result of the appearance attribute of the target person as a response based on the analysis result.

Figure 23:
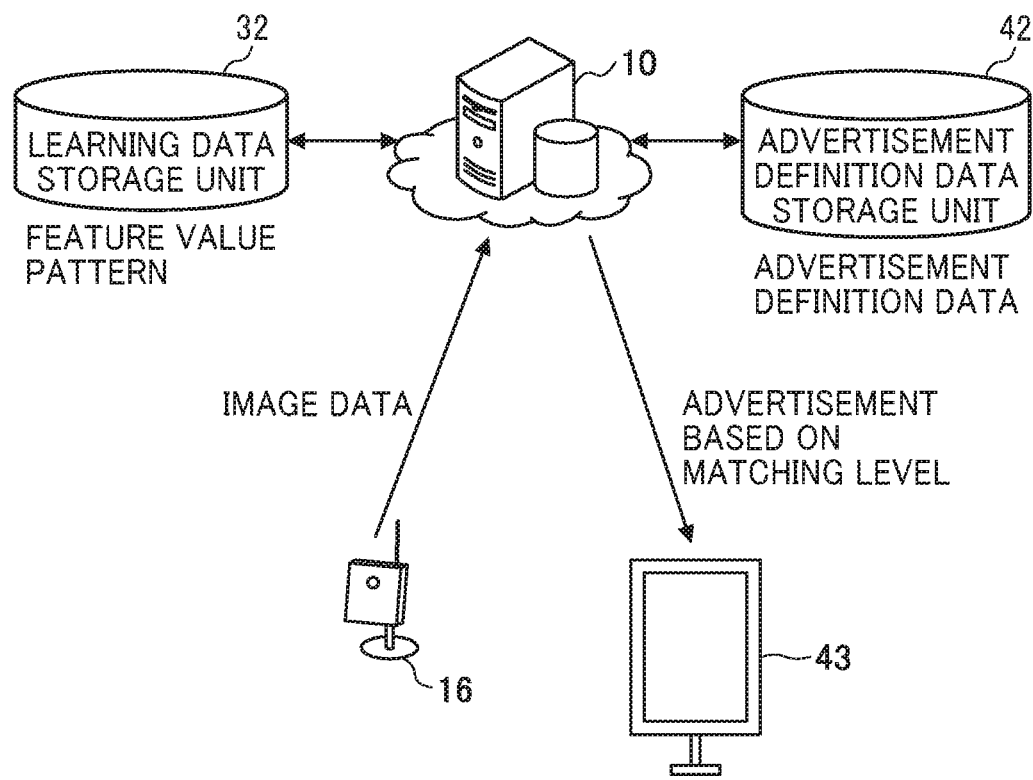
FIG. 23 illustrates an example of a schematic configuration of a system corresponding to example case 3.

FIG. 23 illustrates an example of a schematic configuration of a system corresponding to example case 3. In the system configuration illustrated in FIG. 23, the appearance attribute of the target person in the image data uploaded from the camera 16 is analyzed by the server 10, and then advertisement having an advertisement pattern associated with the analyzed appearance attribute is displayed, for example, on a digital signage display 43.

Figures 24, 25:
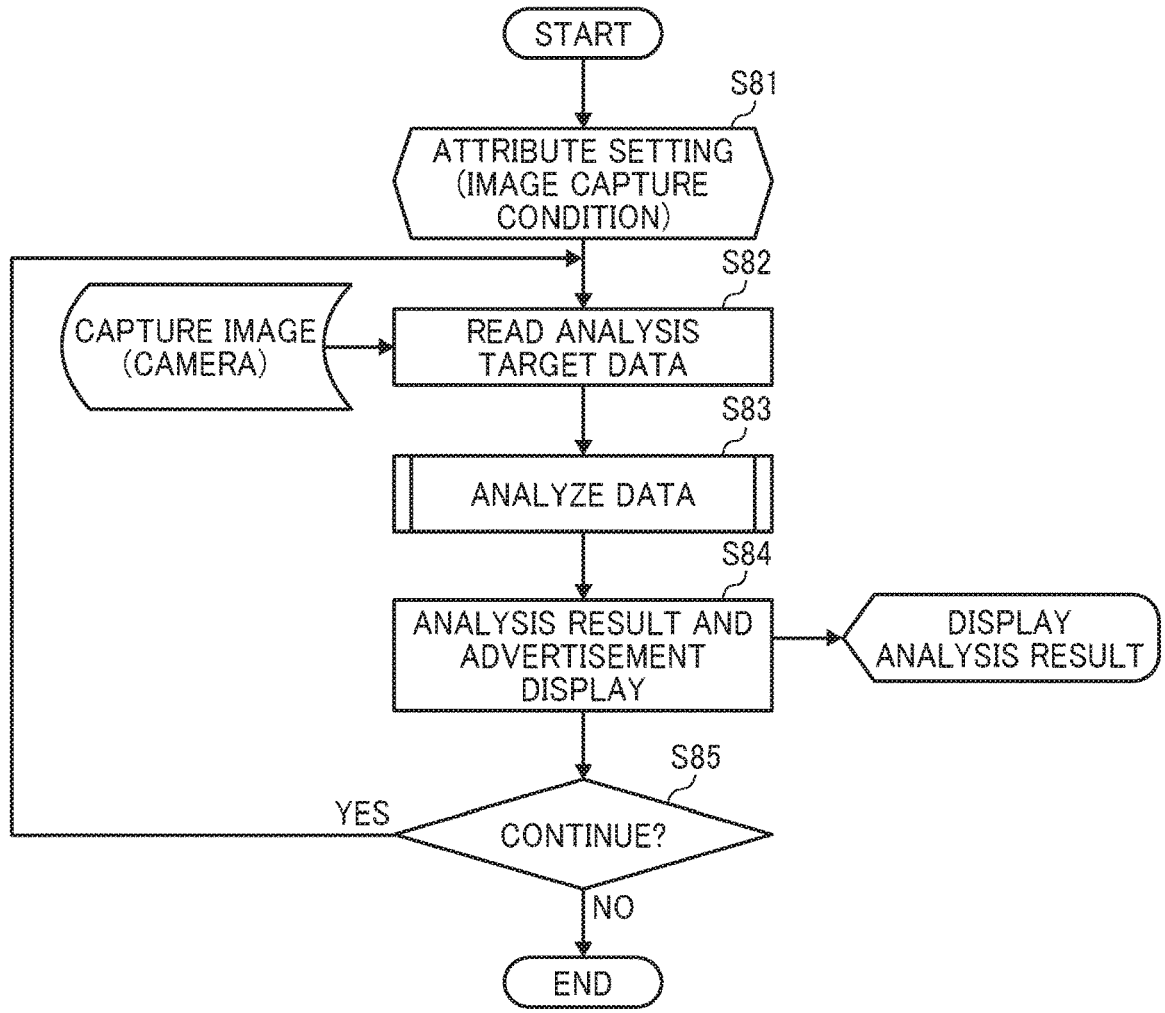
FIG. 24 illustrates an example of a flowchart corresponding to example case 3.
FIG. 25 illustrates an example of advertisement definition data.

FIG. 24 illustrates an example of a flowchart corresponding to example case 3.

In step S81, the camera 16 receives parameter setting required for image capturing in accordance with the attribute setting (image capture condition) from a user.

In step S82, the camera 16 uploads the image data including the target person, which is a target of analyzing the appearance attribute, to the server 10.

In step S83, the appearance attribute analyzing unit 33 analyzes the appearance attribute of the target person in the image data uploaded from the camera 16 using the feature value patterns stored in the learning data storage unit 32.

In step S84, the analysis result output processing unit 35 refers to the advertisement definition data (FIG. 25) and displays the advertisement pattern associated with the appearance attribute of the analyzed target person on the digital signage display 43. In this case, the response corresponds to the advertisement pattern.

In step S85, it is determined whether the sequence is to be continued.

FIG. 25 illustrates an example of the advertisement definition data. The advertisement definition data (FIG. 25) includes data items, such as appearance attribute and an advertisement pattern. The advertisement definition data associates the appearance attribute with the advertisement pattern. The advertisement definition data is stored in, for example, an advertisement definition data storage unit 42 (FIG. 23).

Example Case 4:

In example case 4, a comparison result of the appearance attribute (actual type), pre-set in an area in the image file or data captured by the camera 16, and the appearance attribute of the target person in the area set in the image file or data is utilized for changing the display/layout of goods in stores. Example case 4 requires preliminary preparation condition similar to example case 2 as the preliminary preparation condition.

In example case 4, the client terminal 12 sets the actual type matching data, the server 10 analyzes the appearance attribute of the target person in the area set in the image data captured by the camera 16, and then a comparison result of the analysis result of the appearance attribute of the target person and the actual type matching data is displayed on the client terminal 12 to utilize the comparison result for changing the display and layout of goods in stores.

Figure 26:
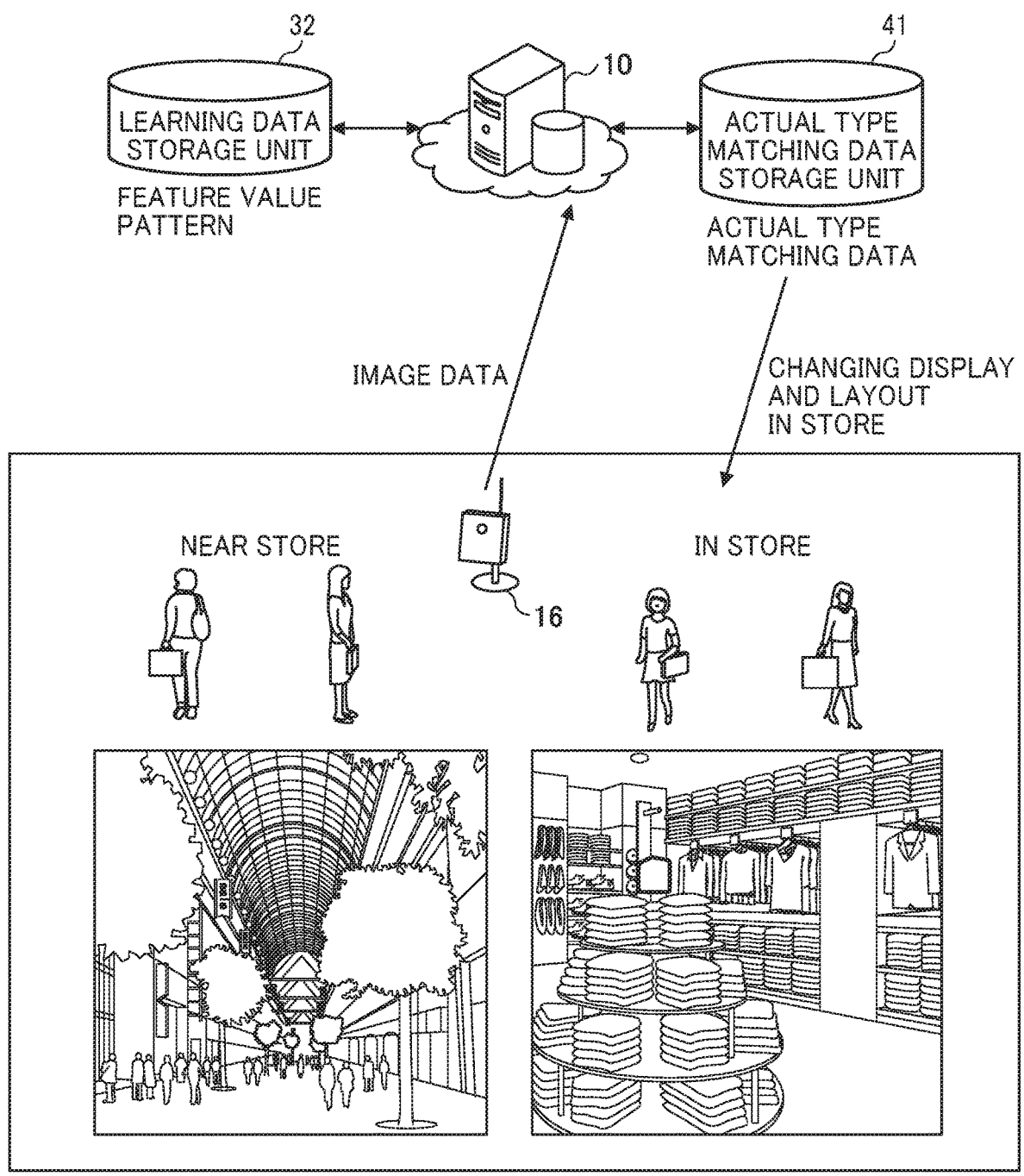
FIG. 26 illustrates an example of a schematic configuration of a system corresponding to example case 4.

FIG. 26 illustrates an example of a schematic configuration of a system corresponding to example case 4. In the system configuration illustrated in FIG. 26, the server 10 analyzes the appearance attribute of the target person captured in the area set in the image data uploaded from the camera 16, compares the analysis result of the appearance attribute of the target person with the actual type matching data, and displays the comparison result on the client terminal 12.

Figure 27:
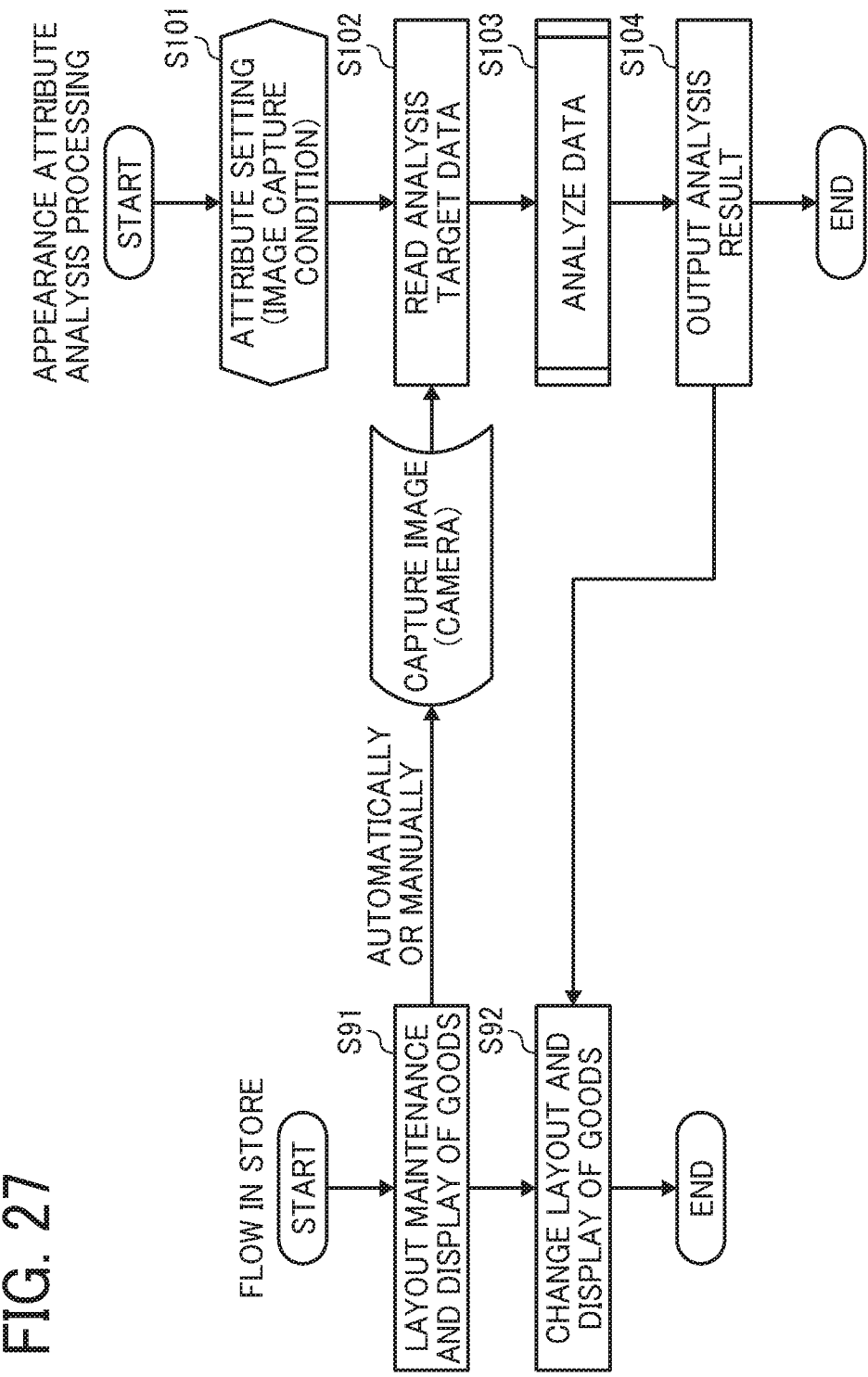
FIG. 27 illustrates an example of a flowchart corresponding to example case 4.

FIG. 27 illustrates an example of a flowchart corresponding to example case 4. In FIG. 27, an action performed by a user in a store is illustrated on the left side, and the appearance attribute analysis processing performed by the information processing system 1A is illustrated on the right side.

In step S91, the user performs layout maintenance and display or exhibiting of goods in the store.

In step S92, the user changes the layout and the display of goods based on the analysis result of the appearance attribute analysis processing illustrated on the right side of FIG. 27.

In step S101, the camera 16 receives parameter setting required for image capture (image capture condition) in accordance with the attribute setting from the user.

In step S102, the camera 16 uploads the image data including the vicinity of the store and the set area in the store to the server 10.

In step S103, the appearance attribute analyzing unit 33 analyzes the appearance attribute of the target person captured in the area set in the image data uploaded from the camera 16 using the feature value patterns stored in the learning data storage unit 32.

In step S104, the analysis result output processing unit 35 compares the appearance attribute of the target person analyzed by the appearance attribute analyzing unit 33 and the actual type associated with the area set in the actual type matching data, and outputs and displays an analysis result on the client terminal 12.

Example Case 5:

In example case 5, the appearance attribute (actual type) set in the area set in the image file or data captured by the camera 16 and the analyzed appearance attribute of the target person in the area set in the image file or data captured by the camera 16 are compared, and a comparison result is utilized for distributing promotional information or materials, such as flyers in accordance with the appearance attribute of the target person. The promotional information or materials can be used as advertisement information. In this description, the promotional information or materials include physical materials such as flyers, and information or data that can be transmitted electronically.

In example case 5, the client terminal 12 sets the actual type matching data, the sever 10 analyzes the appearance attribute of the target person captured in the area set in the image data captured by the camera 16, compares an analysis result of the appearance attribute of the target person and the actual type, and displays a comparison result on the client terminal 12 to utilize the comparison result for distributing promotional information or materials, such as flyers in accordance with the appearance attribute.

Figure 28:
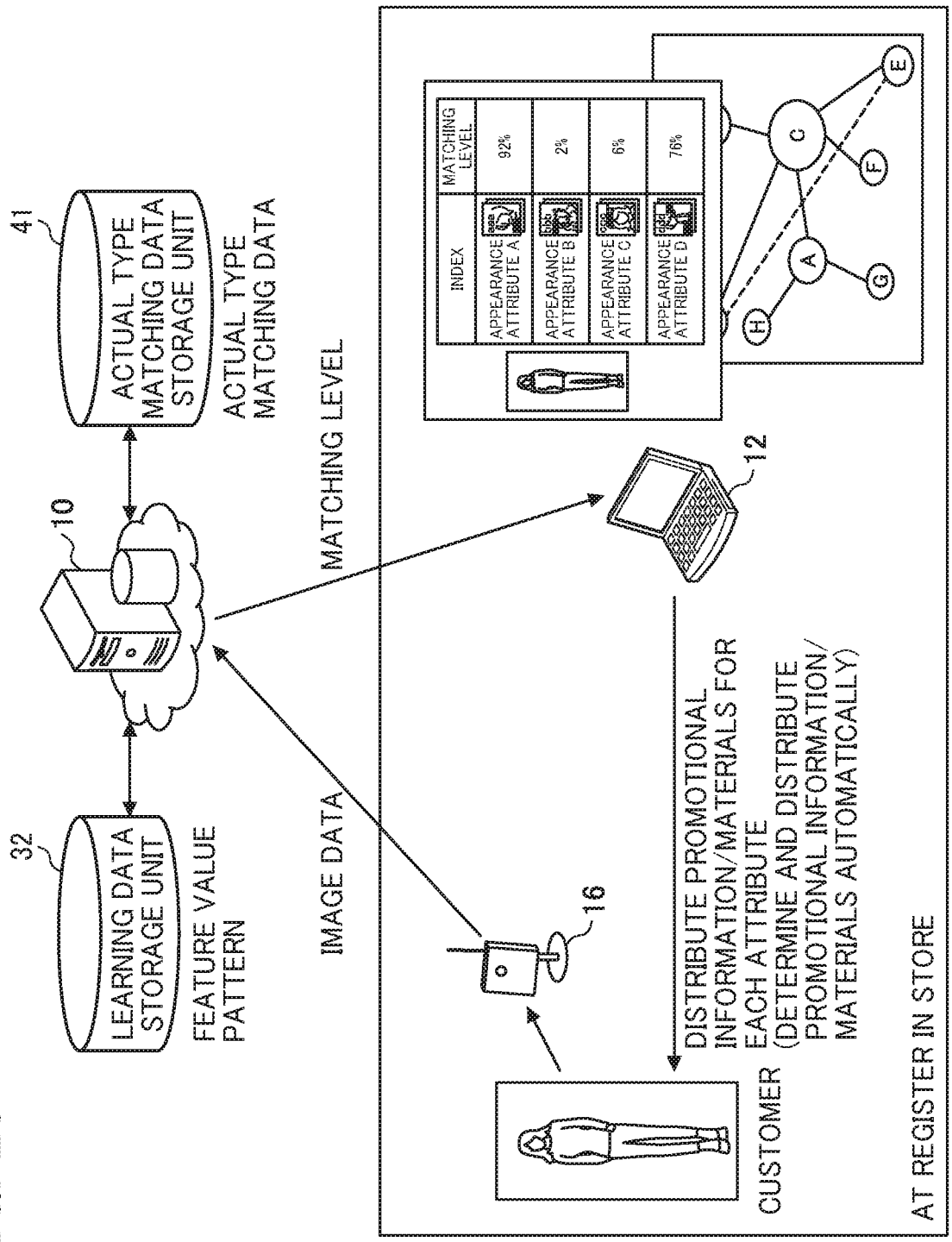
FIG. 28 illustrates an example of a schematic configuration of a system corresponding to example case 5.

FIG. 28 illustrates an example of a schematic configuration of a system corresponding to example case 5. In the system configuration illustrated in FIG. 28, the appearance attribute of the target person captured in the area set in the image data uploaded from the camera 16 is analyzed by the server 10, the analysis result and the actual type matching data are compared by the server 10, and then a type of promotional information (e.g., flyer) to be distributed to a customer having the analyzed appearance attribute is displayed on the client terminal 12 based on the comparison result.

Figure 29:
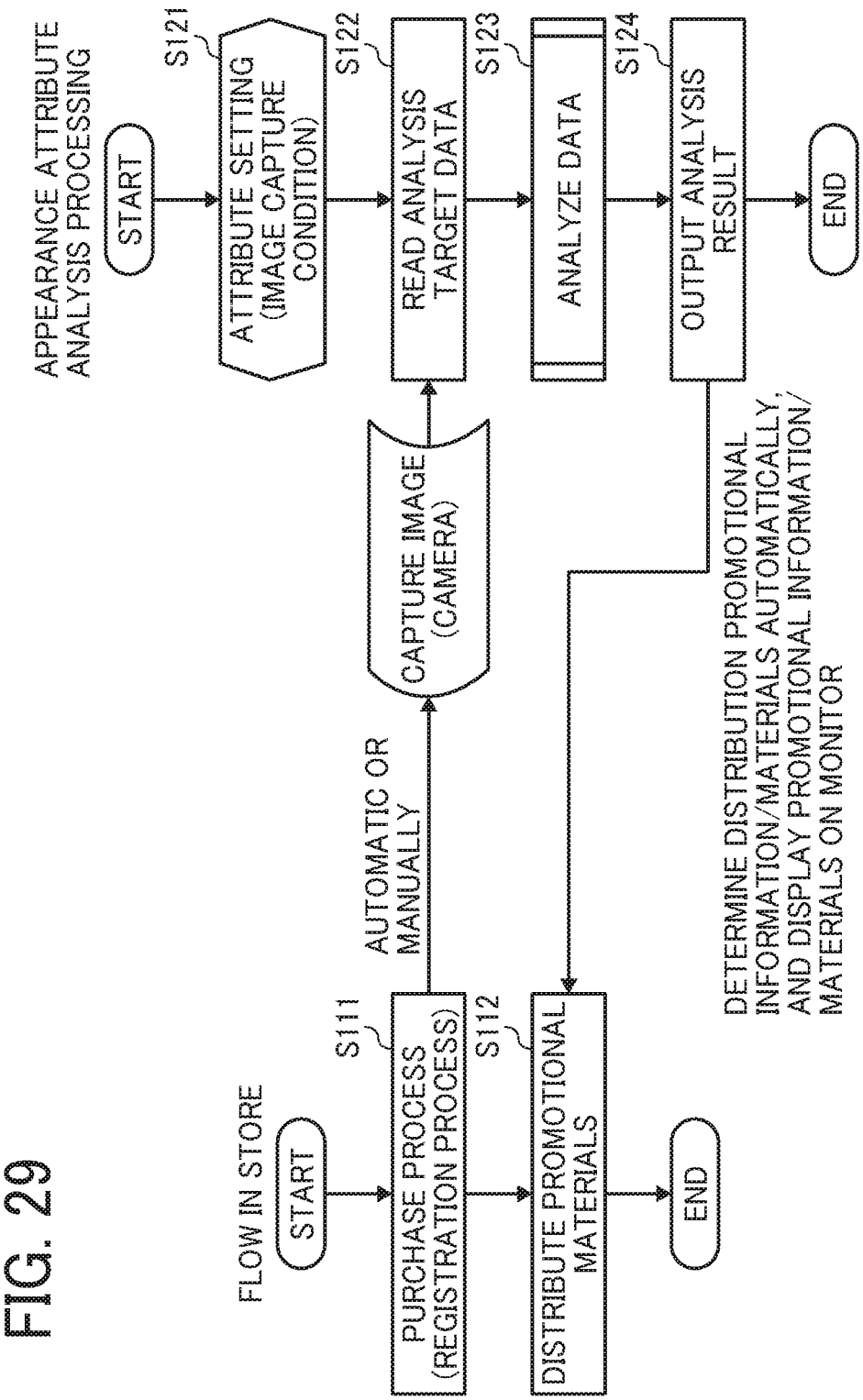
FIG. 29 illustrates an example of a flowchart corresponding to example case 5.

FIG. 29 illustrates an example of a flowchart corresponding to example case 5. In FIG. 29, a user (e.g., clerk) performs in-store processing illustrated on the left side, and the information processing system 1A performs the appearance attribute analysis processing illustrated on the right side.

In step S111, the clerk performs a purchase process (registration process).

In step S112, the clerk can check a type of promotional information (e.g., flyer) displayed on the client terminal 12, to be distributed to a customer, based on the analysis result of the appearance attribute analysis processing on the right side of FIG. 29, and then distributes promotional information or materials, such as flyer, in which the type of distribution promotional information or materials can be automatically determined and displayed on a monitor.

In step S121, the camera 16 receives parameter setting required for image capturing in accordance with the attribute setting (image capture condition) from a user.

In step S122, the camera 16 uploads image data of a customer existing, for example, in front of a register or cash register to the server 10.

In step S123, the appearance attribute analyzing unit 33 analyzes the appearance attribute of the customer in the image data uploaded from the camera 16 using the feature value patterns stored in the learning data storage unit 32.

In step S124, the analysis result output processing unit 35 compares the appearance attribute of the customer analyzed by the appearance attribute analyzing unit 33 and the actual type associated with the area set in the actual type matching data, and causes the client terminal 12 to display a type of promotional information or materials (e.g., flyer) to be distributed to the customer having the analyzed appearance attribute based on the comparison result. In this case, the response corresponds to the promotional information or materials to be distributed to the customer.

Example Case 6:

In example case 6, the appearance attribute is determined, and the determined appearance attribute is added to member information that is being currently stored and used. The member information may be also referred to as the existing member information. Example case 6 requires preliminary preparation condition similar to those of example case 1 as the preliminary preparation condition. In example case 6, the appearance attribute analyzing unit 33 analyzes the appearance attribute of the target person in the image file or data captured by the camera 16, and the analyzed appearance attribute is added to the existing member information.

Figure 30:
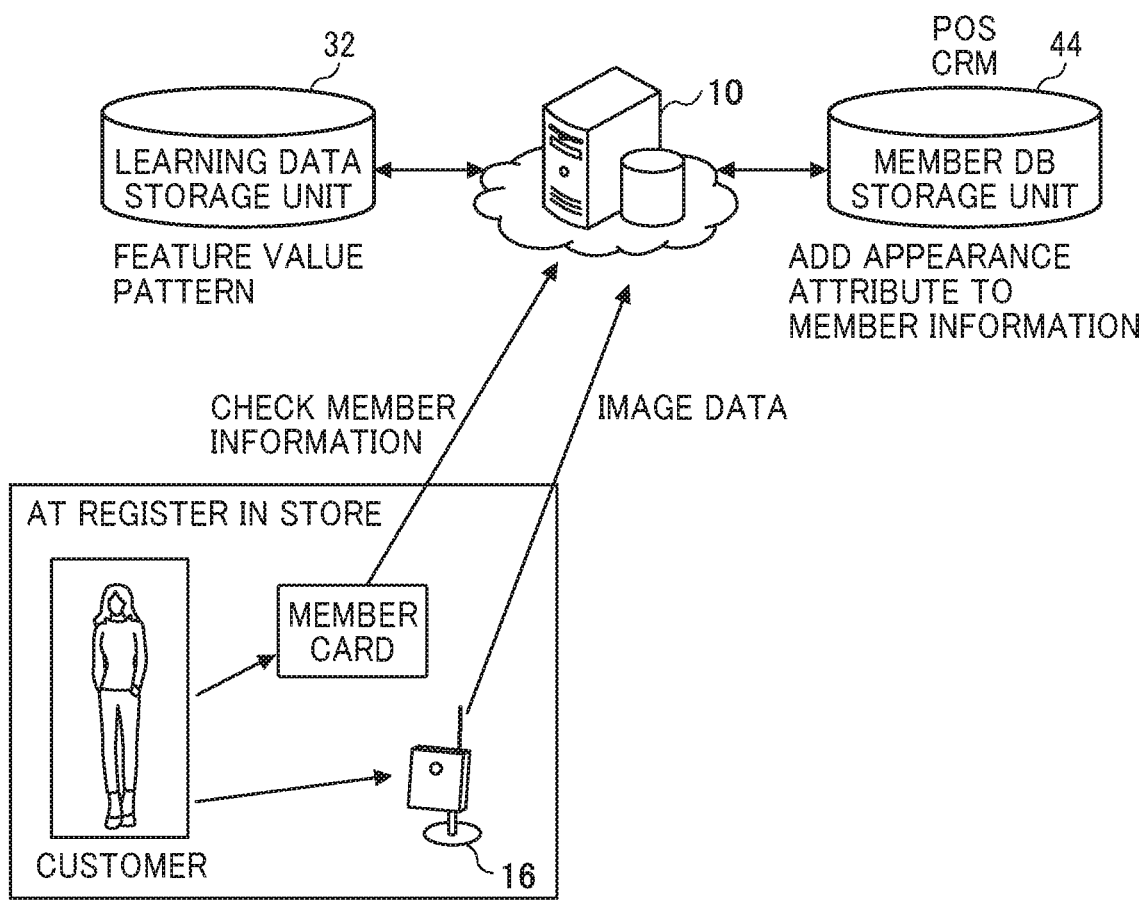
FIG. 30 illustrates an example of a schematic configuration of a system corresponding to example case 6.

FIG. 30 illustrates an example of a schematic configuration of a system corresponding to example case 6. In the system configuration illustrated in FIG. 30, the appearance attribute of a customer in the image data uploaded from the camera 16 is analyzed by the server 10, and the appearance attribute of the customer is added to the member information of the concerned customer, which can be referred to or checked using a member card or the like. The member information of customer is stored, for example, in a member database (DB).

Figure 31:
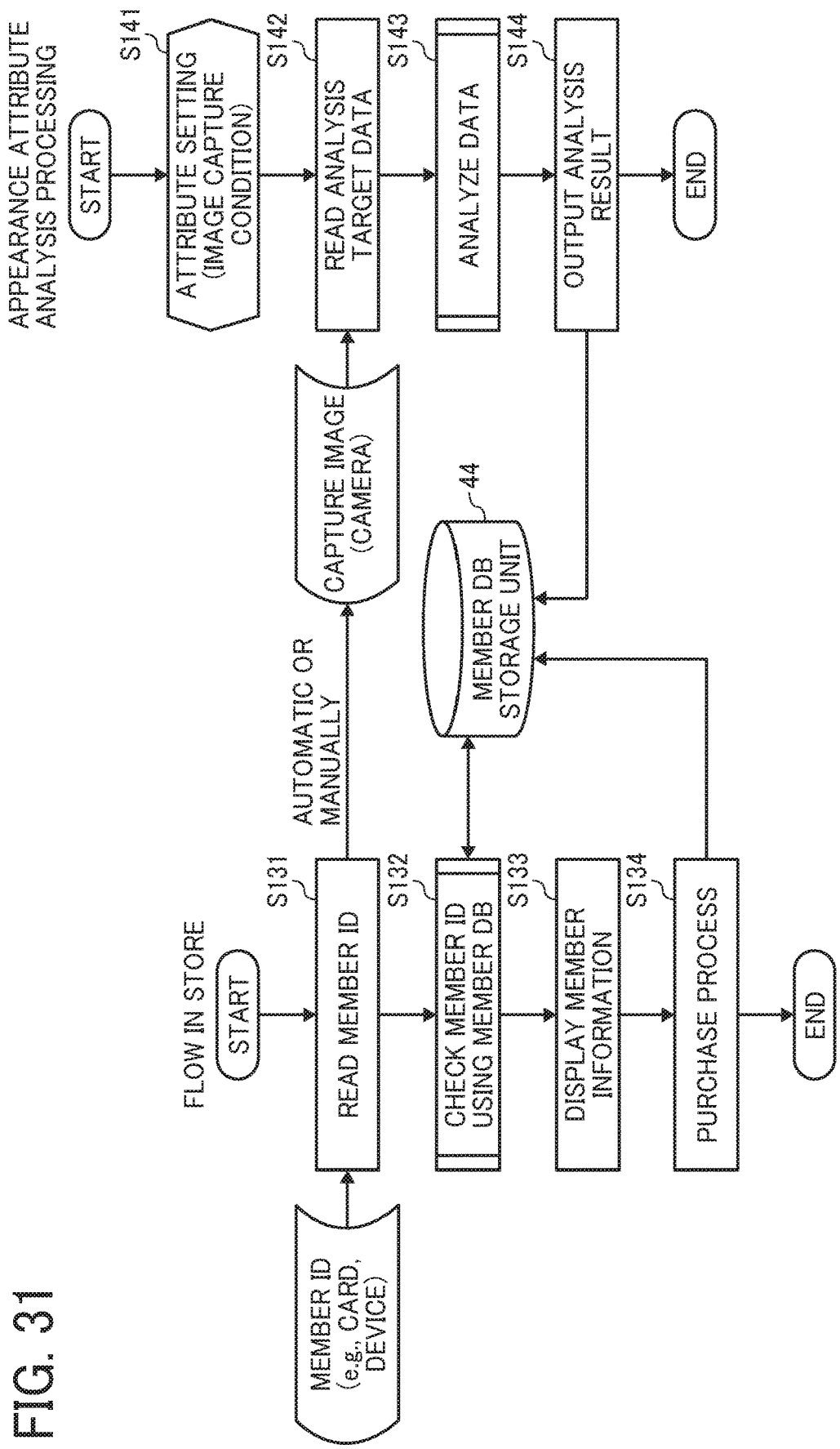
FIG. 31 illustrates an example of a flowchart corresponding to example case 6.

FIG. 31 illustrates an example of a flowchart corresponding to example case 6. In FIG. 31, a user (e.g., clerk) performs in-store processing illustrated on the left side, and the information processing system 1A performs the appearance attribute analysis processing illustrated on the right side.

In step S131, the clerk reads a member ID from a member card belonging to a customer using a card reader, or from a device (e.g., smart phone).

In step S132, the clerk checks the member ID using a member database (DB) storage unit 44. The member DB storage unit 44 may use point of the sale system (POS), customer relationship management (CRM) or the like.

In step S133, the member information of the customer is displayed on a monitor.

Then, the sequence proceeds to step S134, in which the clerk performs a purchase process (checkout process) for the customer.

In step S141, the camera 16 receives parameter setting required for image capturing in accordance with the attribute setting (image capture condition) from the user.

In step S142, the camera 16 uploads image data of the customer existing, for example, in front of a register or cash register to the server 10.

In step S143, the appearance attribute analyzing unit 33 analyzes the appearance attribute of the customer in the image data uploaded from the camera 16 using the feature value patterns stored in the learning data storage unit 32.

In step S144, the analysis result output processing unit 35 adds the appearance attribute analyzed by the appearance attribute analyzing unit 33 to the member information of the concerned customer in the member DB storage unit 44. In this case, the response corresponds to the analyzed appearance attribute.

By adding the appearance attribute to the member information of the concerned customer, the value of the concerned customer can be analyzed from the appearance attribute of the concerned customer in example case 6, and the promotion/campaign matched to preference of each concerned customer can be made, with which an effect of sales improvement can be achieved. Further, by adding the appearance attribute to the member information of the concerned customer, an effect of cost reduction can be achieved by not carrying out promotion and campaign not matching the preference of each concerned customer in example case 6. Further, by adding the appearance attribute to the member information of the concerned customer, customer's preference, which cannot be estimated from conventional data such as member information (e.g., age, occupation) and customer's preference, which cannot be estimated from the purchase history of the customer in one store alone, can be analyzed in example case 6.

Example Case 7:

Example case 7 uses the appearance attribute added to the existing member information in example case 6 for sales promotion. Example case 7 requires preliminary preparation condition similar to those of example case 6 as the preliminary preparation condition. In example case 7, the appearance attribute of the target person in the image file or data captured by the camera 16 is analyzed by the appearance attribute analyzing unit 33, the analyzed appearance attribute is added to the existing member information, and then promotion channels, information or materials are automatically determined based on the analyzed appearance attribute.

Figure 32:
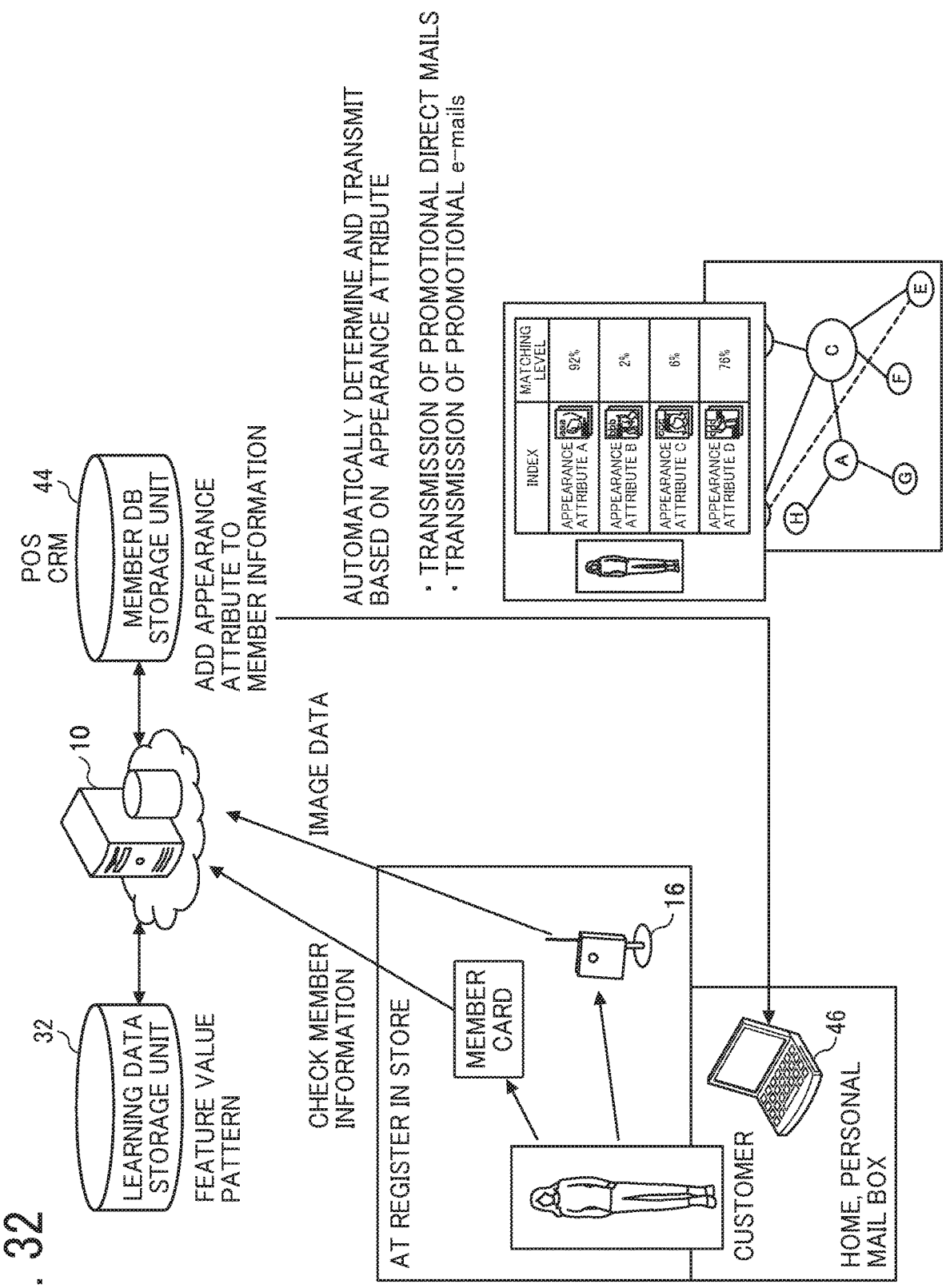
FIG. 32 illustrates an example of a schematic configuration of a system corresponding to example case 7.

FIG. 32 illustrates an example of a schematic configuration of a system corresponding to example case 7. In the system configuration illustrated in FIG. 32, the appearance attribute of a customer in the image data uploaded from the camera 16 is analyzed by the server 10, and the appearance attribute of the customer is added to the member information of the concerned customer, which can be referred to or checked using a member card or the like. For example, a management server managing the transmission of promotional direct mails and promotional e-mails can automatically determine promotion channels to the customers, and automatically transmit the promotional direct mails or promotional e-mails to the customers in accordance with the appearance attribute added to the member information.

Figure 33:
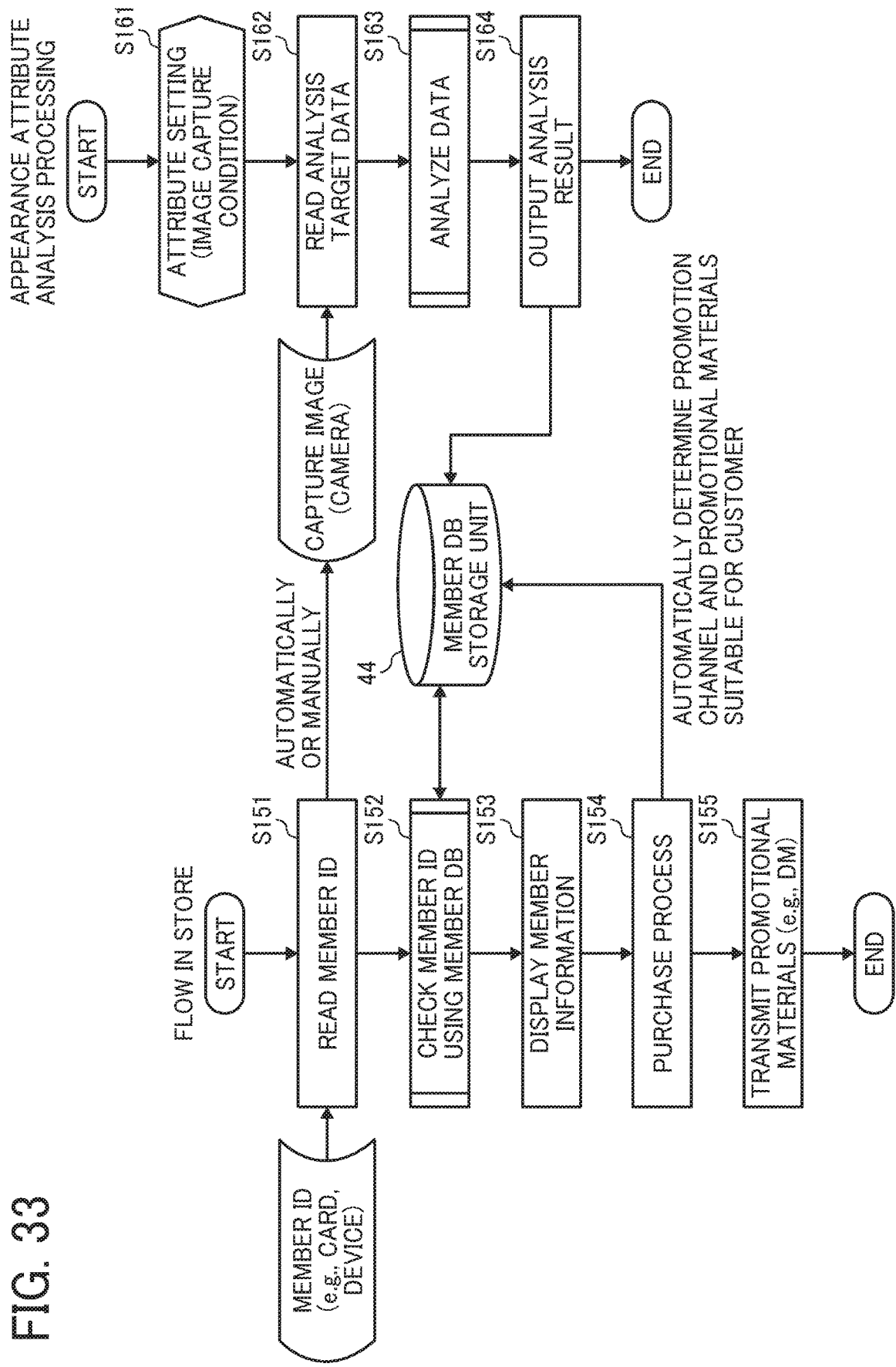
FIG. 33 illustrates an example of a flowchart corresponding to example case 7.

FIG. 33 illustrates an example of a flowchart corresponding to example case 7. In FIG. 33, a user (e.g., clerk) performs in-store processing illustrated on the left side, and the information processing system 1A performs the appearance attribute analysis processing illustrated on the right side.

In step S151, the clerk reads a member ID from a member card belonging to the customer using a card reader, or from a device (e.g., smart phone).

In step S152, the clerk checks the member ID using the member DB storage unit 44.

In step S153, the member information of the customer is displayed on a monitor.

Then, the sequence proceeds to step S154, in which the clerk performs a purchase process (checkout process) for the customer.

Then, in step S155, the management server managing the transmission of promotional direct mails and promotional e-mails can automatically transmit the promotional information or materials using the promotion channel suitable for the customer or output the promotional information or materials to be manually handled by the clerk in accordance with the appearance attribute added to the member information.

In step S161, the camera 16 receives parameter setting required for image capturing in accordance with the attribute setting (image capture condition) from the user.

In step S162, the camera 16 uploads the image data of the customer existing, for example, in front of a register or cash register to the server 10.

In step S163, the appearance attribute analyzing unit 33 analyzes the appearance attribute of the customer in the image data uploaded from the camera 16 using the feature value patterns stored in the learning data storage unit 32.

In step S164, in accordance with the appearance attribute analyzed by the appearance attribute analysis unit 33, the analysis result output processing unit 35 automatically determines promotion channels and promotional information or materials suitable for each concerned customer in accordance with the appearance attribute analyzed by the appearance attribute analyzing unit 33, and then adds the promotion channels and the promotional information or materials to the member information of each concerned customer. In this case, the response corresponds to the promotion channels and promotional information or materials suitable for the customer.

Example Case 8:

Example case 8 determines the appearance attribute, adds the determined appearance attribute to the existing member information and associates the appearance attribute with web activity information of customer. Example case 8 requires preliminary preparation condition similar to example case 6 as the preliminary preparation condition. In example case 8, the appearance attribute analyzing unit 33 analyzes the appearance attribute of the target person in the image file or data captured by the camera 16, adds the appearance attribute to the existing member information, and then associates the appearance attribute with the web activity information stored in a web activity information storage unit 45. The web activity information includes information, such as purchase history, browsing information, cart information, and search engine of each customer.

Figure 34:
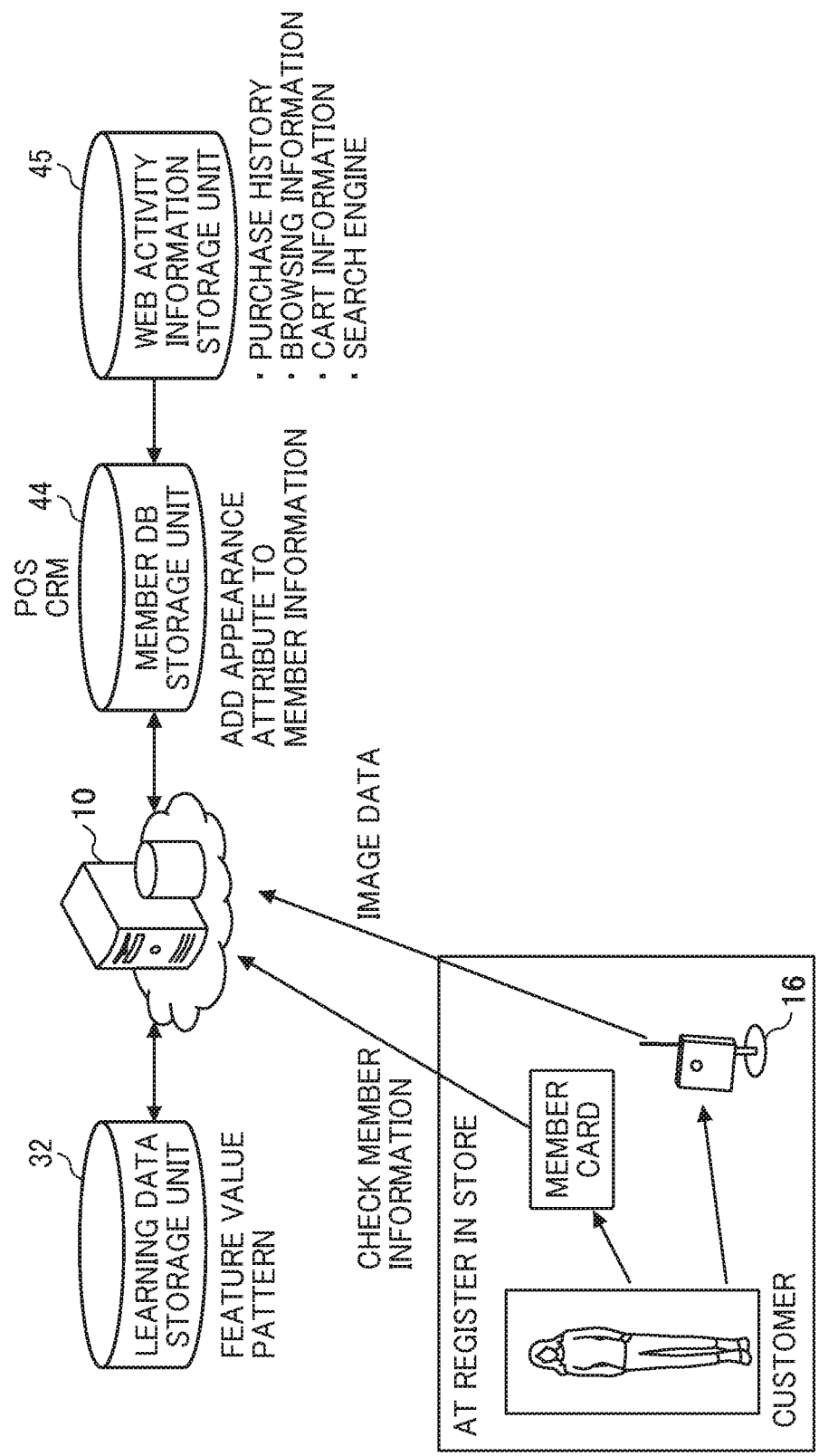
FIG. 34 illustrates an example of a schematic configuration of a system corresponding to example case 8.

FIG. 34 illustrates an example of a schematic configuration of a system corresponding to example case 8. In the system configuration illustrated in FIG. 34, the appearance attribute of a customer in the image data uploaded from the camera 16 is analyzed by the server 10, and the appearance attribute of the customer is added to the member information of the concerned customer, which can be referred to or checked using a member card or the like. Further, the member information of the concerned customer is linked with the web activity information, such as a purchase history and browsing information of the concerned customer.

Figure 35:
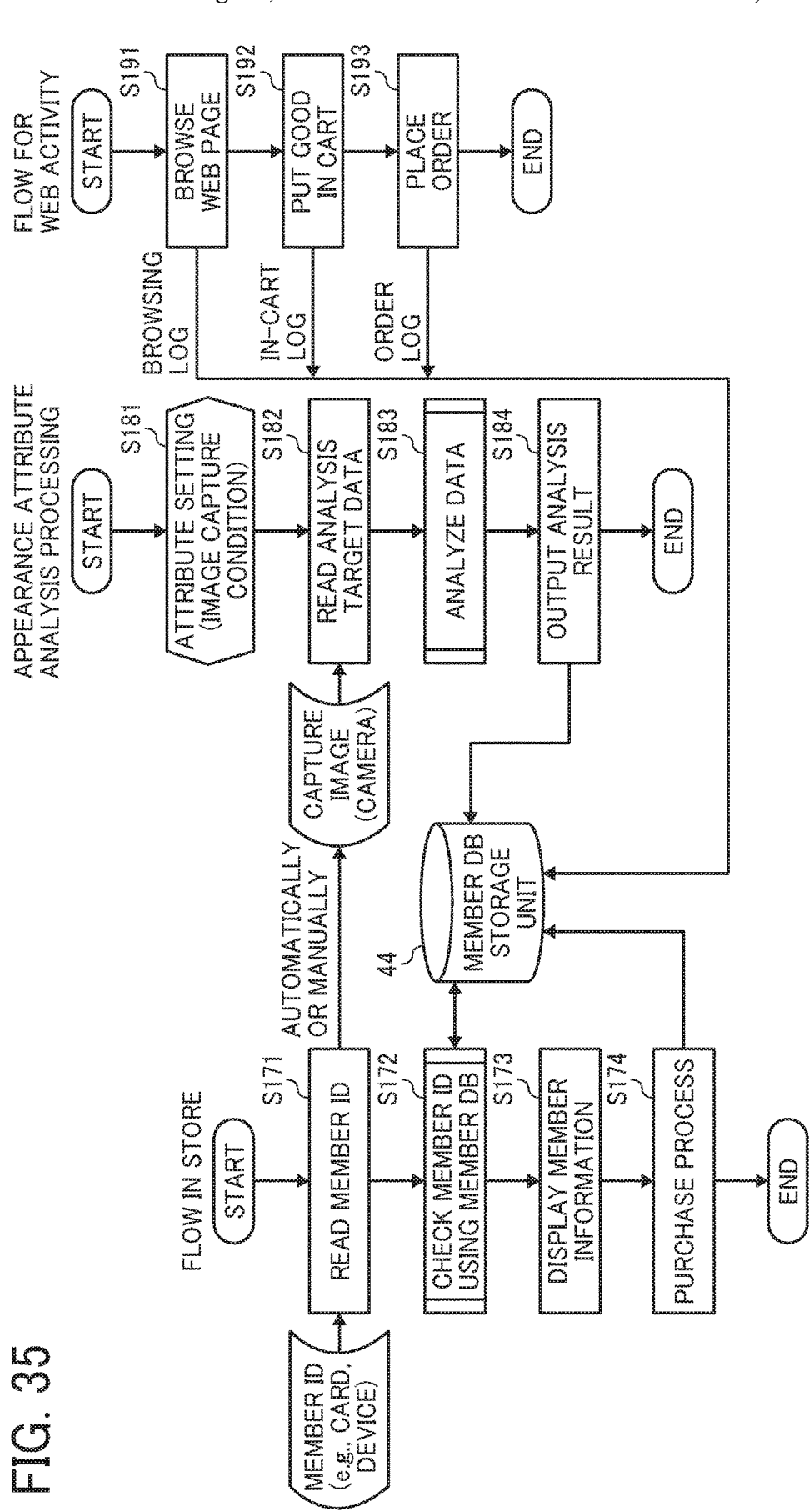
FIG. 35 illustrates an example of a flowchart corresponding to example case 8.

FIG. 35 illustrates an example of a flowchart corresponding to example case 8. In FIG. 35, a user (e.g., clerk) performs in-store processing illustrated on the left side, the information processing system 1A performs the appearance attribute analysis processing illustrated on the center, and the customer performs the web activity processing illustrated on the right side.

In step S171, the clerk reads a member ID from a member card belonging to the customer using a card reader, or from a device (e.g., smart phone).

In step S172, the clerk checks the member ID using the member DB storage unit 44.

In step S173, the member information of the customer is displayed on a monitor.

Then, the sequence proceeds to step S174, in which the clerk performs a purchase process (checkout process) for the customer.

In step S181, the camera 16 receives parameter setting required for image capturing in accordance with the attribute setting (image capture condition) from the user.

In step S182, the camera 16 uploads the image data of the customer existing, for example, in front of a register or cash register to the server 10.

In step S183, the appearance attribute analyzing unit 33 analyzes the appearance attribute of the customer in the image data uploaded from the camera 16 using the feature value patterns stored in the learning data storage unit 32.

In step S184, the analysis result output processing unit 35 adds the appearance attribute analyzed by the appearance attribute analyzing unit 33 to the member information of the concerned customer. In this case, the response corresponds to the analyzed appearance attribute.

In step S191, the customer browses a web page and then adds a browsing log to the member information of the customer as the browsing information.

In step S192, the customer puts a good in a cart on the web page and then adds an in-cart log to the member information of the customer as the cart information.

In step S193, the customer places an order of good on the web page and then adds an order log to the member information of the customer as the purchase history.

Example Case 9:

The example case 9 uses the appearance attribute and the web activity information added to the existing member information in example case 8 for sales promotion. The example case 9 requires preliminary preparation condition similar to those of example cases 7 and 8 as the preliminary preparation condition. In example case 9, the appearance attribute analyzing unit 33 analyzes the appearance attribute of the target person in the image file or data captured by the camera 16, adds the appearance attribute of the target person to the existing member information, associates the appearance attribute of the target person with the web activity information stored in the web activity information storage unit 45, and automatically determines promotion channels and promotional information or materials in accordance with the appearance attribute of the target person such as a customer.

Figure 36:
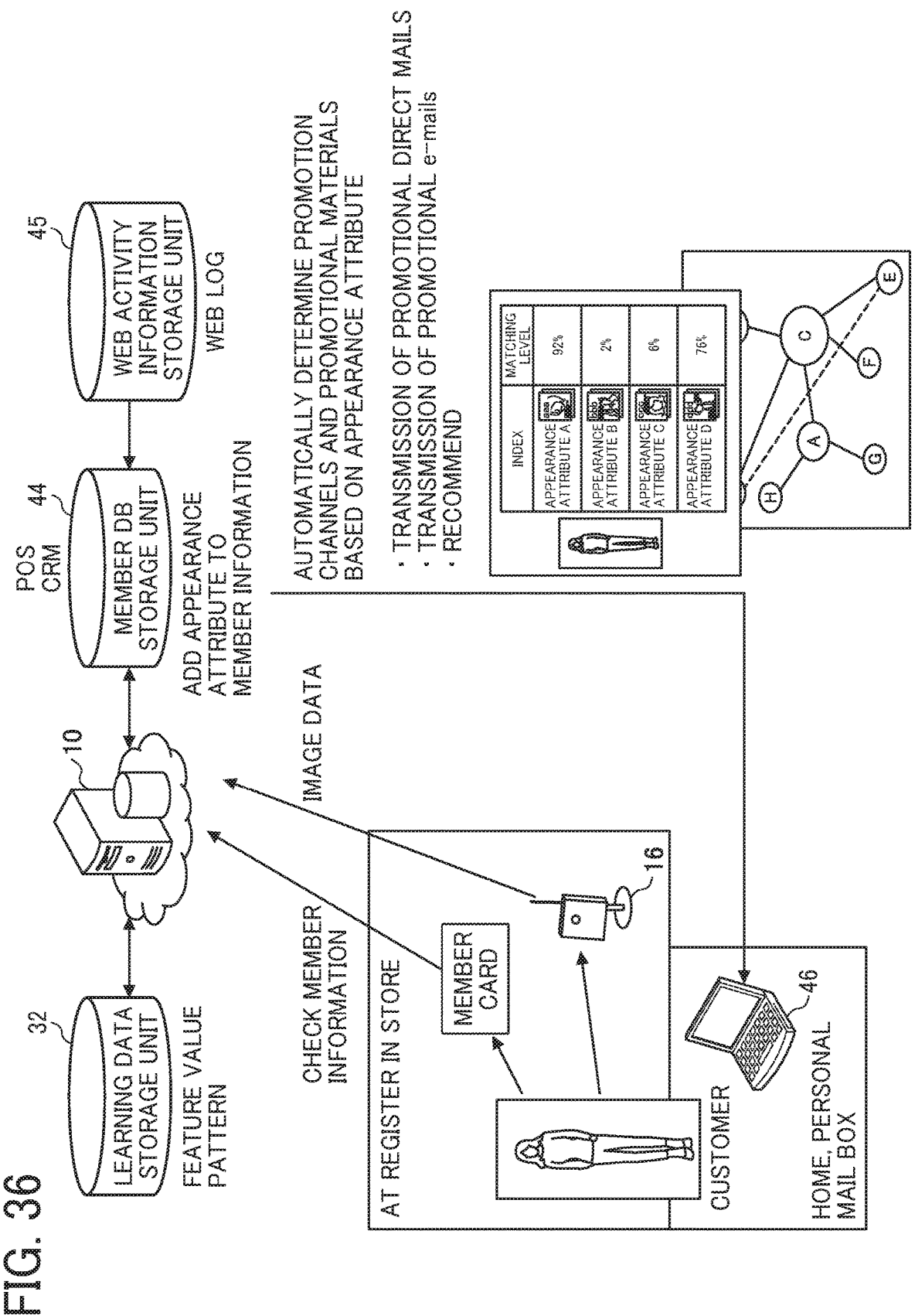
FIG. 36 illustrates an example of a schematic configuration of a system corresponding to example case 9.

FIG. 36 illustrates an example of a schematic configuration of a system corresponding to example case 9. In the system configuration illustrated in FIG. 36, the appearance attribute of the customer in the image data uploaded from the camera 16 is analyzed by the server 10, and the appearance attribute of the customer is added to the member information of the concerned customer, which can be referred to or checked using a member card or the like. Further, the member information of the concerned customer is linked with the web activity information, such as purchase history and browsing information of the concerned customer. For example, a management server managing the transmission of promotional direct mails and promotional e-mails can automatically determine promotion channels to the concerned customer, and automatically transmit the promotional mails or e-mails to the concerned customer in accordance with the appearance attribute added to the member information and the web activity information.

Figure 37:
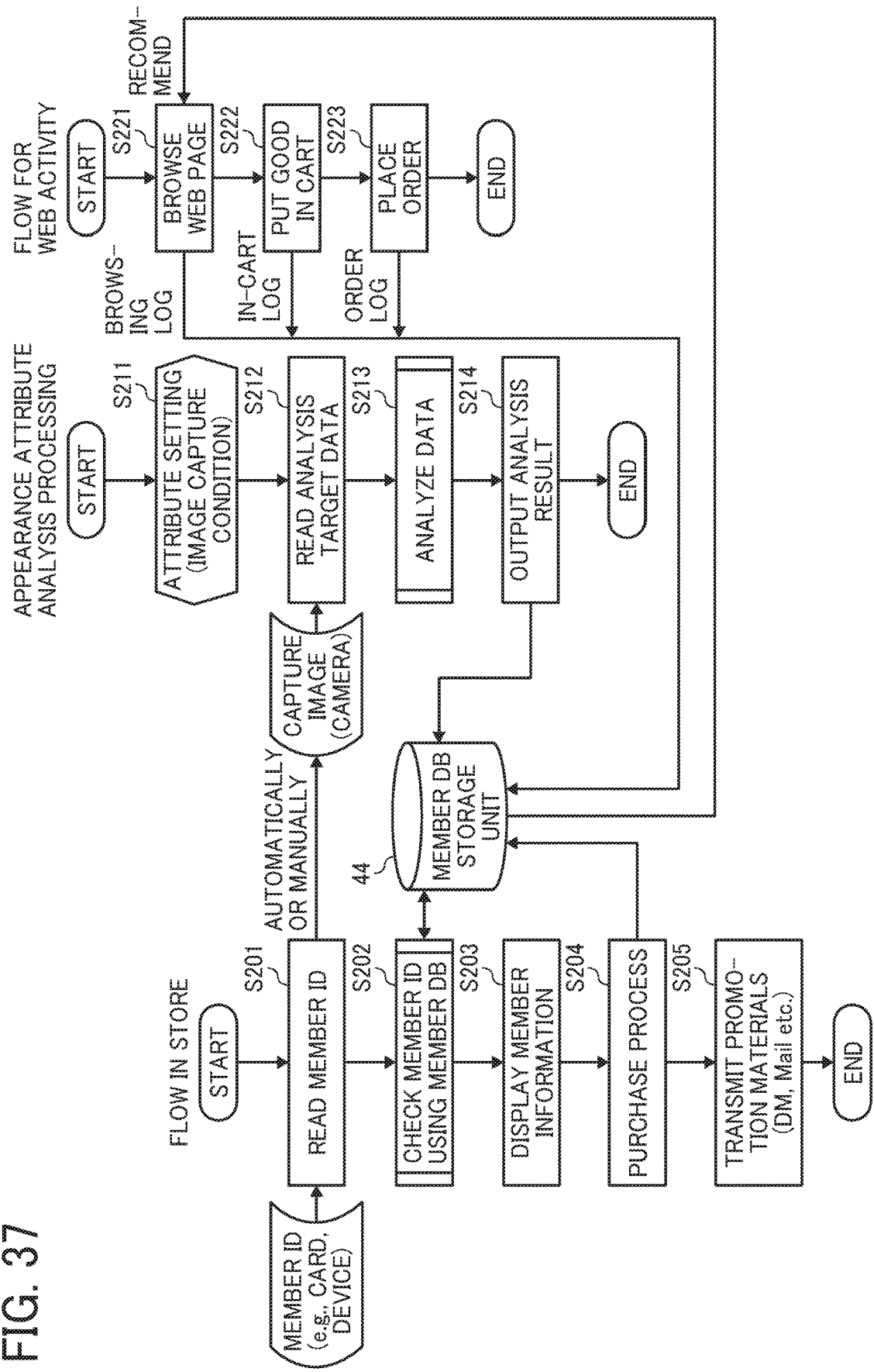
FIG. 37 illustrates an example of a flowchart corresponding to example case 9.

FIG. 37 illustrates an example of a flowchart corresponding to example case 9. In FIG. 37, a user (e.g., clerk) performs in-store processing illustrated on the left side, the information processing system 1A performs the appearance attribute analysis processing illustrated on the center, and the customer performs the web activity processing illustrated on the right side.

In step S202, the clerk reads a member ID from a member card belonging to the customer using a card reader, or from a device (e.g., smart phone).

In step S202, the clerk checks the member ID using the member DB storage unit 44.

In step S203, the member information of the customer is displayed on a monitor.

Then, the sequence proceeds to step S204, in which the clerk performs a purchase process (checkout process) for the customer.

Then, in step S205, the management server managing the transmission of promotional direct mails and promotional e-mails can automatically transmit the promotional information or materials using the promotion channel suitable for the customer or output the promotional information or materials to be manually handled by the user in accordance with the appearance attribute added to the member information.

In step S211, the camera 16 receives parameter setting required for image capturing in accordance with the attribute setting (image capture condition) from the user.

In step S212, the camera 16 uploads the image data of the customer existing, for example, in front of a register or cash register to the server 10.

In step S213, the appearance attribute analyzing unit 33 analyzes the appearance attribute of the customer in the image data uploaded from the camera 16 using the feature value patterns stored in the learning data storage unit 32.

In step S214, the analysis result output processing unit 35 adds the appearance attribute analyzed by the appearance attribute analyzing unit 33 to the member information of the concerned customer. In this case, the response corresponds to the analyzed appearance attribute.

In step S221, the customer browses the web page and then adds a browsing log to the member information of the customer as the browsing information.

In step S222, the customer puts a good in a cart on the web page and then adds an in-cart log in the member information of the customer as the cart information.

In step S223, the customer places an order of good on the web page and then adds an order log to the member information of the customer as the purchase history.

Example Case 10:

Example case 10 predicts an over-time change of the appearance attribute added to the existing member information in example case 6. Example case 10 requires preliminary preparation condition similar to those of example case 6 as the preliminary preparation condition. In example case 10, the appearance attribute analyzing unit 33 analyzes the appearance attribute of the target person in the image file or data captured by the camera 16, adds the appearance attribute (e.g., with a ratio various style, such as feminine style of 50%, carrier style of 40%, and street style of 10%) to the existing member information. Further, the information of the over-time change (e.g., age, life event) of the appearance attribute of customer is accumulated in the existing member information. By accumulating information of the over-time change of the appearance attribute of a large number of customers, a change of appearance attribute of a concerned customer (target person) over time can be predicted from the current appearance attribute of the concerned customer in example case 10.

Figure 38:
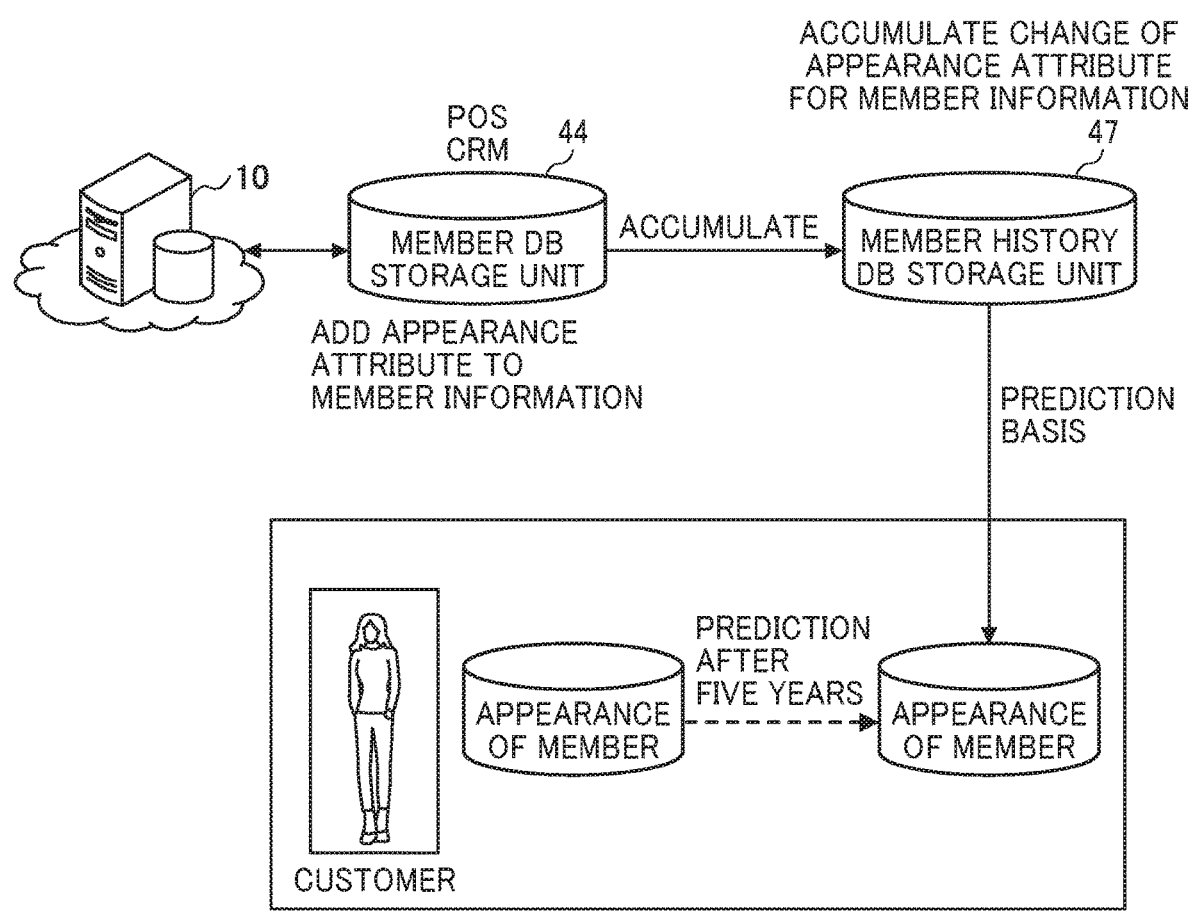
FIG. 38 illustrates an example of a schematic configuration of a system corresponding to example case 10.

FIG. 38 illustrates an example of a schematic configuration of a system corresponding to example case 10. In the system configuration illustrated in FIG. 38, the appearance attribute of the customer analyzed by the server 10 is stored in the member DB storage unit 44. A member history database (DB) storage unit 47 stores information of over-time change of the appearance attribute of customers. By utilizing information of the over-time change of the appearance attribute of the customers, the server 10, which analyzes the appearance attribute, can predict the over-time change of appearance attribute (e.g., 5 years later) of a target customer in example case 10.

Figure 39:
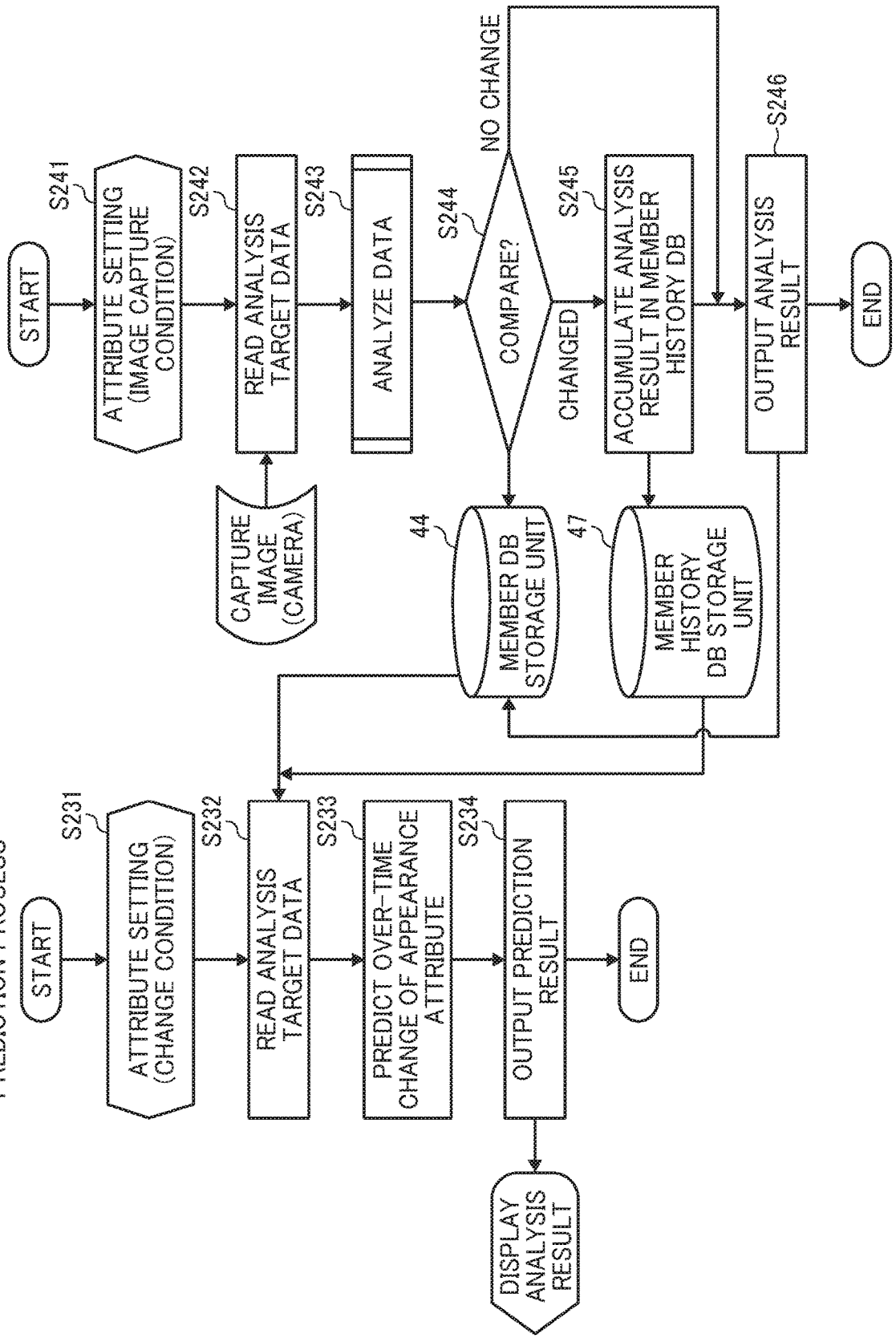
FIG. 39 illustrates an example of a flowchart corresponding to example case 10.

FIG. 39 illustrates an example of a flowchart corresponding to example case 10. In FIG. 39, an appearance attribute analysis prediction processing is illustrated on the left side, and an appearance attribute updating processing is illustrated on the right side.

In step S231, the server 10 receives parameter setting required for the appearance attribute prediction analysis in accordance with the attribute setting (change condition) from a user.

In step S232, the server 10 reads the current appearance attribute of the concerned customer from the member DB storage unit 44 and the information of the over-time change of appearance attribute of a large number of customers stored in the member history DB storage unit 47.

In step S233, the server 10 predicts the over-time change of appearance attribute of the concerned customer based on the current appearance attribute of the concerned customer read in step S232 and the information of over-time change of appearance attribute of the large number of customers stored in the member history DB storage unit 47.

In step S234, the server 10 outputs the over-time change of the appearance attribute of the concerned customer (target person) as a prediction result, which is an example of the analysis result. In this case, the response corresponds to the prediction result.

In step S241, the camera 16 receives parameter setting required for image capturing in accordance with the attribute setting (image capture condition) from the user.

In step S242, the camera 16 uploads the image data of the customer existing, for example, in front of a register or cash register to the server 10.

In step S243, the appearance attribute analyzing unit 33 analyzes the appearance attribute of the concerned customer in the image data uploaded from the camera 16 using the feature value patterns stored in the learning data storage unit 32.

In step S244, the appearance attribute analyzing unit 33 compares the current appearance attribute of the analyzed concerned customer and the past appearance attribute included in the member information of the concerned customer in the member DB storage unit 44.

If the appearance attribute analyzing unit 33 detects a change of the appearance attribute of the analyzed concerned customer (S244: YES), in step S245, the appearance attribute analyzing unit 33 accumulates the current appearance attribute of the analyzed concerned customer, which is the analysis result of step S243, in the member history DB storage unit 47.

In step S246, the analysis result output processing unit 35 adds the appearance attribute of the concerned customer analyzed by the appearance attribute analyzing unit 33 to the member information of the concerned customer. In this case, the response corresponds to the analyzed appearance attribute.

By accumulating information of the over-time change of appearance attribute of the large number of customers in the member history DB storage unit 47, the change of the current appearance attribute of the concerned customer (target person) over time can be predicted based on the information of the over-time change of the appearance attribute accumulated for the large number of customers in example case 10.

Further, for example, the appearance attribute of the customer can be calculated by calculating a ratio of the appearance attribute based on a visit history in the past one year or so. For example, if a visit history of the concerned customer is in a sequence order of "girlish style, feminine style, beautiful style, sister gal style, feminine style and beautiful style," and a visit history in the past one year is in a sequence order of "feminine style, beautiful style, sister gal style, feminine style and beautiful style," the ratio of the appearance attribute becomes 60% for feminine type, 17% for sister gal sister, and 33% for beautiful style.

Further, for example, if the ratio of the current appearance attribute of the concerned customer is, for example, girly style of 50%, street style of 40%, and feminine style of 10%, the over-time change of appearance attribute of the concerned customer over some years later can be predicted, such as feminine style of 50%, sister gal style of 30%, and carrier style of 20%.

Further, for example, if the ratio of the current appearance attribute of the concerned customer is, for example, feminine style of 50%, sister gal style of 30%, and carrier style of 20%, the over-time change of appearance attribute of the concerned customer over some years later can be predicted, such as beautiful style of 40%, feminine style of 20%/o, carrier style of 20%, and Mrs. style of 10%.

In example case 10, the change of appearance attribute of customers of the same type is accumulated from big data of the accumulated feature value patterns, and then the change of appearance attribute of an individual person can be predicted. For example, by cooperating with the member information, such as age, the change of appearance attribute can be predicted more accurately in example case 10.

Further, in example case 10, a life event of customer can be predicted from the change of the appearance attribute of the concerned customer. For example, if one customer has a visit history in the order of "feminine style, feminine style, feminine style, Mrs. style, feminine style, Mrs. style and Mrs. style," it can be predicted that this customer has a life event such as a birth of a child between the third style (feminine style) and the fifth style (feminine style).

Further, if one customer has a visit history in the sequence order of "girly style, girly style, young OL style, feminine style, young OL style and feminine style," it can be predicted that this customer has a life event such as employment between the third style (young OL style), the fourth style (feminine style) and the fifth style (young OL style).

As to the above described embodiment, the information processing system can analyze values of persons based on image data acquired by capturing images of persons.

Numerous additional modifications and variations are possible in light of the above teachings. It is therefore to be understood that, within the scope of the appended claims, the disclosure of this specification may be practiced otherwise than as specifically described herein. Any one of the above-described operations may be performed in various other ways, for example, in an order different from the one described above.

It should be noted that the information processing system 1A and 1B described in the above embodiment are just examples, and there are various examples of the system configuration in accordance with applications and purposes.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An information processing system comprising:
    circuitry configured to
    store, in a memory, one or more feature value patterns associated with an appearance attribute of at least one of clothing or accessories of one or more groups of persons calculated from a plurality of acquired image data using machine learning, in which each one of the groups assumed to have a unique group value being different for each one of the groups;
    receive image data of a target person input as analysis target data;
    analyze an appearance attribute of the target person in the image data using the one or more feature value patterns associated with the appearance attribute of the one or more groups stored in the memory; and
    output a response corresponding to an analysis result of the appearance attribute of the target person, wherein the circuitry is further configured to
    receive a designation of an area set for the image data input as the analysis target data, and a designation of particular appearance attributes specified in the set area in advance, the set area including one or more set areas, and
    output a response in accordance with a comparison result of the appearance attribute of the target person and the particular appearance attribute designated for the seat area.

2. The information processing system of claim 1,
    wherein the circuitry calculates the one or more feature value patterns associated with the appearance attribute of the one or more groups of persons from the plurality of acquired image data using machine learning based on an assumption that a group value of each one of the groups is the same value in each one of the groups, and stores the one or more feature value patterns associated with the appearance attribute of the one or more groups of persons in the memory.

3. The information processing system of claim 1, further comprising:
    an image capture device that captures an image of the target person to output the image data of the target person, wherein the circuitry receives the image data of the target person from the image capturing device.

4. The information processing system according to claim 1,
    wherein the one or more groups of persons include at least a first group having a first group value and a second group having a second group value different from the first group value of the first group,
    wherein when the circuitry receives the plurality of acquired image data as image data of the first group having the first group value, the circuitry applies one or more processing uniquely set for the appearance attribute of the first group to duplicate an amount of the image data of the first group, and when the circuitry receives the plurality of acquired image data as image data of the second group having the second group value, the circuitry applies one or more processing uniquely set for the appearance attribute of the second group to duplicate an amount of the image data of the second group.

5. The information processing system of claim 1,
    wherein the circuitry analyzes and outputs a matching level of the appearance attribute of the target person in the image data, input as the analysis target data, and the appearance attribute of the one or more groups stored in the memory.

6. The information processing system of claim 1,
    wherein the circuitry calculates a correlation value between the appearance attributes of the groups using the one or more feature value patterns associated with the appearance attribute of the one or more groups,
    wherein the circuitry analyzes a correlation level of the appearance attribute of the target person in the image data and the appearance attribute of each of the groups and outputs a response in accordance with the correlation level of the appearance attribute of the target person in the image data and the appearance attribute of each of the groups.

7. The information processing system of claim 1,
    wherein the circuitry uses advertisement definition data defining advertisement information in accordance with the appearance attribute of the target person to output specific advertisement information in accordance with the appearance attribute of the target person in the image data, input and analyzed as the analysis target data.

8. The information processing system of claim 1,
wherein the circuitry adds the appearance attribute of the target person to existing information of the target person.

9. The information processing system of claim 8,
wherein based on information related to a change of the appearance attribute of a plurality of persons accumulated for a given period of time, the circuitry predicts an over-time change of the appearance attribute of the target person in the image data, input and analyzed as the analysis target data, and outputs a prediction result of the over-time change of the appearance attribute of the target person.

10. The information processing system of claim 9,
wherein the circuitry predicts a life event of the target person based on the information related to the change of the appearance attribute of the plurality of persons.

11. An information processing apparatus comprising:
circuitry configured to
store, in a memory, one or more feature value patterns associated with an appearance attribute of at least one of clothing or accessories of one or more groups of persons calculated from a plurality of acquired image data using machine learning, in which each one of the groups assumed to have a unique group value being different for each one of the groups;
receive image data of a target person input as analysis target data;
analyze an appearance attribute of the target person in the image data using the one or more feature value patterns associated with the appearance attribute of the one or more groups stored in the memory; and
output a response corresponding to an analysis result of the appearance attribute of the target person, wherein the circuitry is further configured to
receive a designation of an area set for the image data input as the analysis target data, and a designation of particular appearance attributes specified in the set area in advance, the set area including one or more set areas, and
output a response in accordance with a comparison result of the appearance attribute of the target person and the particular appearance attribute designated for the seat area.

12. A method of processing information, the method comprising:
receiving image data of a target person input as analysis target data;
receiving a designation of an area set for the image data input as the analysis target data, and a designation of particular appearance attributes specified in the set area in advance, the set area including one or more set areas,
analyzing an appearance attribute of a target person in image data input as analysis target data using one or more feature value patterns associated with appearance attribute of at least one of clothing or accessories of one or more groups of persons calculated from a plurality of acquired image data using machine learning and stored in a memory, in which each one of the groups assumed to have a unique group value being different for each one of the groups; and
outputting a response corresponding to an analysis result of the appearance attribute of the target person; and
outputting a response in accordance with a comparison result of the appearance attribute of the target person and the particular appearance attribute designated for the set area.

* * * * *